United States Patent
Ishimatsu

(10) Patent No.: US 8,777,416 B2
(45) Date of Patent: Jul. 15, 2014

(54) POLARIZATION BEAM SPLITTING ELEMENT AND IMAGE PROJECTION APPARATUS

(75) Inventor: Rie Ishimatsu, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 282 days.

(21) Appl. No.: 13/432,104

(22) Filed: Mar. 28, 2012

(65) Prior Publication Data

US 2012/0249969 A1    Oct. 4, 2012

(30) Foreign Application Priority Data

Mar. 28, 2011    (JP) .................. 2011-070176

(51) Int. Cl.
| | |
|---|---|
| *G03B 21/00* | (2006.01) |
| *G03B 21/14* | (2006.01) |
| *G03B 21/28* | (2006.01) |
| *G02B 5/30* | (2006.01) |
| *G02B 27/28* | (2006.01) |

(52) U.S. Cl.
USPC ............ 353/20; 353/31; 353/33; 353/81; 359/485.01; 359/485.03

(58) Field of Classification Search
USPC ........... 353/20, 30–31, 33–34, 48–51, 81–82, 353/84, 94; 359/483.01, 485.01, 359/485.03–485.04, 485.06; 349/8–9
See application file for complete search history.

(56) References Cited

U.S. PATENT DOCUMENTS

| | | | |
|---|---|---|---|
| 7,234,816 B2* | 6/2007 | Bruzzone et al. | 353/20 |
| 8,066,381 B2* | 11/2011 | Sunaga | 353/20 |
| 2004/0130681 A1* | 7/2004 | Aastuen et al. | 353/20 |
| 2004/0227994 A1* | 11/2004 | Ma et al. | 359/487 |

FOREIGN PATENT DOCUMENTS

| | | | |
|---|---|---|---|
| JP | 2003502708 A | 1/2003 |
| JP | 2003-519818 A | 6/2003 |
| JP | 2008523422 A | 7/2008 |
| WO | 00/79317 A1 | 12/2000 |
| WO | 01/51964 A1 | 7/2001 |
| WO | 2006-063049 A1 | 6/2006 |

* cited by examiner

*Primary Examiner* — Tony Ko
*Assistant Examiner* — Jori S Reilly-Diakun
(74) *Attorney, Agent, or Firm* — Rossi, Kimms & McDowell LLP

(57) ABSTRACT

The polarization beam splitting element splits an entering beam according to polarization directions. The element includes, in order from a beam entrance side, an entrance side multi-layered film layer constituted by laminated multiple dielectric films, and a one-dimensional grating structure having a grating period smaller than a wavelength of the entering beam and formed of a metal. When a medium existing on the beam entrance side further than the entrance side multi-layered film layer is referred to as an entrance medium, the multiple dielectric films constituting the entrance side multi-layered film layer include at least one dielectric film having a higher refractive index than that of the entrance medium and at least one dielectric film having a lower refractive index than that of the entrance medium.

9 Claims, 17 Drawing Sheets

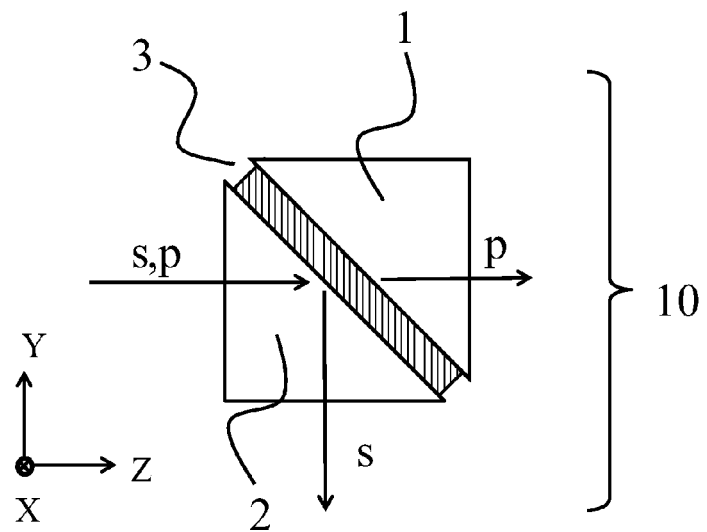
FIG. 1
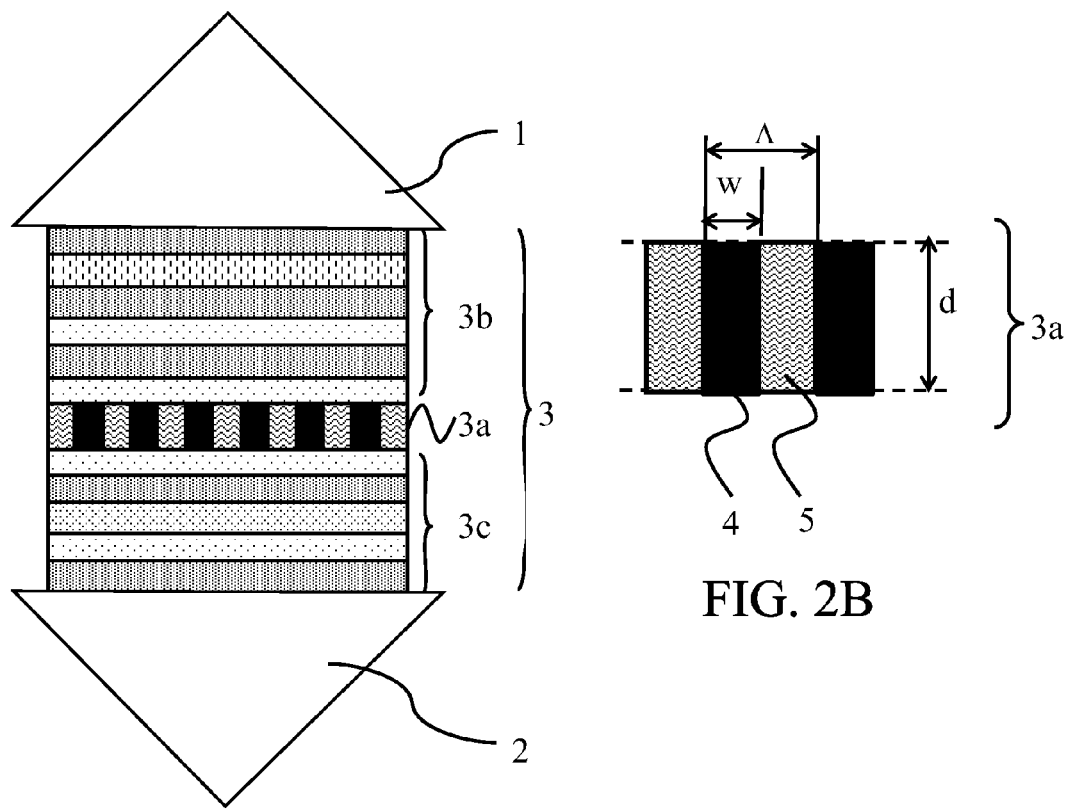
FIG. 2A
FIG. 2B

POLARIZATION BEAM SPLITTING ELEMENT AND IMAGE PROJECTION APPARATUS

BACKGROUND OF THE INVENTION

1. Field of the Invention

The present invention relates to a polarization beam splitting element that splits an entering beam according to polarization directions, and particularly to a polarization beam splitting element that is constituted by a wire grid (one-dimensional grating structure) having a grating period smaller than a wavelength of the entering beam and a multi-layered dielectric film layer.

2. Description of the Related Art

A wire grid that is a one-dimensional grating structure formed of a metal and having a grating period smaller than a wavelength (also referred to as a "use wavelength") of an entering beam has a function of splitting beams whose polarization directions are mutually different. Japanese Patent Laid-Open No. 2003-502708 discloses a wire grid having a visible wavelength-order minute grating period and formed on a substrate.

Such a wire grid is generally designed to reflect s-polarized light and transmit p-polarized light. However, in fact the wire grid reflects part of the p-polarized light to be transmitted therethrough, which deteriorates its beam splitting characteristic and light utilization efficiency.

Thus, Japanese Patent Laid-Open No. 2008-523422 discloses a wire grid polarization beam splitting element in which a layer formed by laminated dielectric thin films or by laminated dielectric grids is disposed at an interface between a wire grid and a substrate or an entrance medium, for the purpose of suppressing reflection of p-polarized light. Moreover, Japanese Patent Laid-Open No. 2003-519818 discloses a wire grid polarization beam splitting element that is used by being sandwiched between transparent substrates or prisms, for the purpose of suppressing generation of astigmatism at the substrate and of improving handling easiness of grating.

However, the polarization beam splitting elements disclosed in Japanese Patent Laid-Open Nos. 2003-502708, 2008-523422 and 2003-519818 require increase of a grating thickness of the wire grid in order to achieve a sufficiently high reflectance for s-polarized light, which causes the wire grid to absorb the p-polarized light to be transmitted.

Moreover, the wire grid polarization beam splitting element that is used by being sandwiched between the transparent substrates or prisms can suppress the generation of the astigmatism by the substrate, but has a higher reflectance for the p-polarized light as compared with a case where an air or vacuum space is formed on a beam entrance side of the wire grid.

SUMMARY OF THE INVENTION

The present invention provides a polarization beam splitting element capable of achieving a sufficient reflectance for s-polarized light while suppressing a reflectance for p-polarized light, and of reducing absorption loss caused by a wire grid. The present invention also provides an image projection apparatus using such a polarization beam splitting element.

The present invention provides as an aspect thereof a polarization beam splitting element configured to split an entering beam according to polarization directions. The element includes, in order from a beam entrance side, an entrance side multi-layered film layer constituted by laminated multiple dielectric films, and a one-dimensional grating structure having a grating period smaller than a wavelength of the entering beam and formed of a metal. When a medium existing on the beam entrance side further than the entrance side multi-layered film layer is referred to as an entrance medium, the multiple dielectric films constituting the entrance side multi-layered film layer include at least one dielectric film having a higher refractive index than that of the entrance medium and at least one dielectric film having a lower refractive index than that of the entrance medium.

The present invention provides as another aspect thereof an image projection apparatus including a color separation optical system using the above polarization beam splitting element.

Further features of the present invention will become apparent from the following description of exemplary embodiments with reference to the attached drawings.

BRIEF DESCRIPTION OF THE DRAWINGS

FIG. 1 shows a configuration of a polarization beam splitting element that is a representative embodiment of the present invention.

FIGS. 2A and 2B show a configuration of a polarization beam splitting part of the polarization beam splitting element shown in FIG. 1.

DESCRIPTION OF THE PREFERRED EMBODIMENTS

Figure 3:
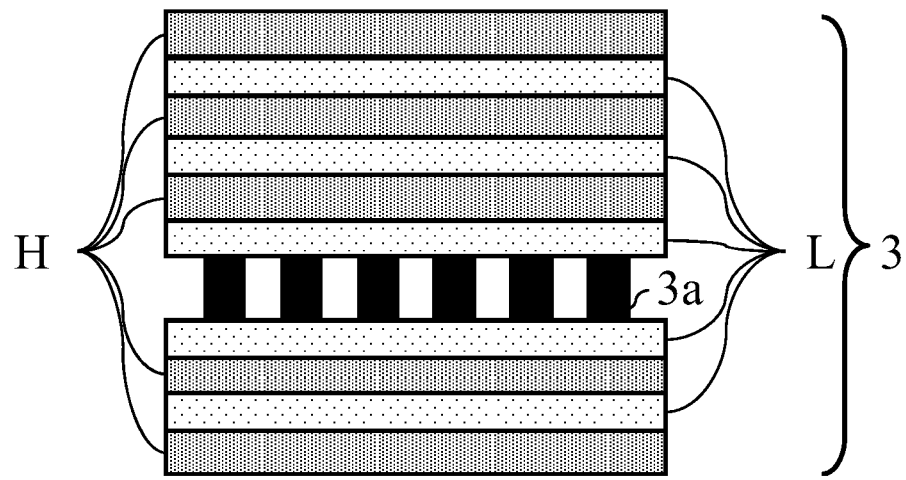
FIG. 3 shows a configuration of a polarization beam splitting part of a polarization beam splitting element that is Embodiment 1 of the present invention.

Exemplary embodiments of the present invention will hereinafter be described with reference to the accompanying drawings.

First of all, prior to description of specific embodiments, a configuration of a polarization beam splitting element that is a representative embodiment of the present invention will be described with reference to FIGS. 1, 2A and 2B.

The polarization beam splitting element 10 is constituted by two prisms 1 and 2 having a light transmissive property and a polarization beam splitting part 3 disposed between the prisms 1 and 2.

An entering beam that is non-polarized light including an s-polarized light component (hereinafter simply referred to as "s-polarized light") and a p-polarized light component (hereinafter simply referred to as "p-polarized light") is transmitted through the prism 2 to enter the polarization beam splitting part 3. The polarization beam splitting part 3 reflects the s-polarized light of the entering beam and transmits the p-polarized light thereof by its polarization beam splitting function. The s-polarized light reflected by the polarization beam splitting part 3 is transmitted through the prism 2 to exit from the polarization beam splitting element 10, and the p-polarized light transmitted through the polarization beam splitting part 3 is transmitted through the prism 1 to exit from the polarization beam splitting element 10. A wavelength of the entering beam, that is, a use wavelength is whole or part of a visible wavelength range of 400-700 nm.

In the following description, a plane including the entering beam and a normal to the polarization beam splitting part 3 is referred to as "an entrance plane". Light whose electric field oscillates in the entrance plane corresponds to the p-polarized light, and light whose electric field oscillates in a direction perpendicular to the entrance plane corresponds to the s-polarized light. A detailed configuration of the polarization beam splitting part 3 will be described later.

Figure 20A:
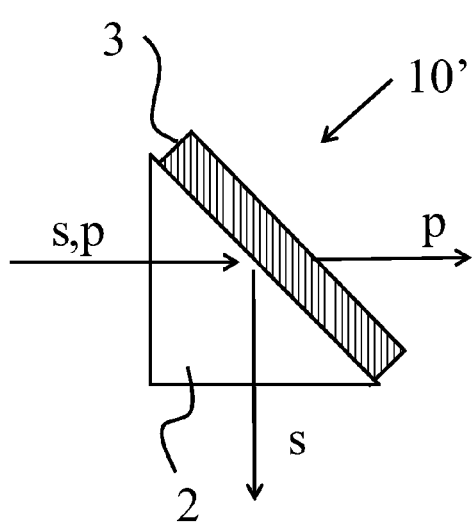
FIGS. 20A and 20B show modified examples of the embodiments.
Figure 20B:
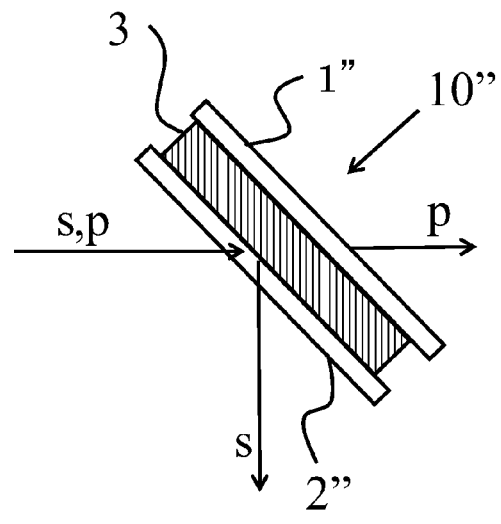

Although this embodiment treats the polarization beam splitting part 3 and the prisms 1 and 2 sandwiching the polarization beam splitting part 3 collectively as the polarization beam splitting element 10, the prisms 1 and 2 are not necessarily needed for the polarization beam splitting element. For example, as shown in FIG. 20A a polarization beam splitting element 10' may be constituted only by the prism 2 and the polarization beam splitting part 3, and as shown in FIG. 20B a polarization beam splitting element 10" may be constituted by disposing the polarization beam splitting part 3 between two planar substrates 1" and 2" having a light transmissive property. Moreover, a polarization beam splitting element may be constituted only by the polarization beam splitting part 3 without using prisms and planar substrates.

FIG. 2A schematically shows a configuration of the polarization beam splitting part 3 in the polarization beam splitting element 10 of this embodiment. The polarization beam splitting part 3 includes, in order from a beam entrance side (prism 2 side) toward a beam exit side (prism 1 side), an entrance side multi-layered film layer 3c, a wire grid 3a and an exit side multi-layered film layer 3b. The entrance side multi-layered film layer 3c and the exit side multi-layered film layer 3b are each constituted by laminated multiple dielectric films. The wire grid 3a is a one-dimensional grating structure formed of a metal and having a grating period smaller than the wavelength of the entering beam (use wavelength). The exit side multi-layered film layer 3b is not necessarily provided.

FIG. 2A exaggeratingly shows the structures of the wire grid 3a and the multi-layered film layers 3c and 3b for easy understanding of the configuration of the polarization beam splitting part 3, and thus an actual size relationship between the prisms 1 and 2 and the polarization beam splitting part 3 is different from that shown in FIG. 2A.

FIG. 2B schematically shows the structure of the wire grid 3a. The wire grid 3a is constituted by alternately disposing grating portions (hereinafter referred to as "metal grating portions") 4 formed of the above-mentioned metal and inter-grating portions 5. Each inter-grating portion 5 is disposed between the metal grating portions 4. Parameters deciding polarization characteristics of the wire grid 3a are a grating thickness d, a width (hereinafter referred to as "a grating width") w of the metal grating portion 4 and a filling factor FF representing a ratio w/λ of the grating width w to the grating period (grating pitch) of the metal grating portion 4. As mentioned above, the wire grid 3a (metal grating portions 4) has the grating period λ sufficiently smaller than the wavelength of the entering beam.

As shown in FIG. 1, an axis extending in a direction perpendicular to an entrance surface of the prism 2, that is, an axis extending in a direction forming an angle of 45 degrees with a direction perpendicular to a surface of the polarization beam splitting part 3 is defined as a z-axis, and an angle of each ray of the entering beam with respect to the z-axis is defined as an incident angle of the ray. The entering beam enters the prism 2 at an incident angle within a certain angle range (for example, ±10°). When defining that angle range as an incident angle range, in order to minimize reflectance of the wire grid 3a for the p-polarized light within this incident angle range, it is necessary that the grating period λ and the grating width w satisfy the following condition (1):

$$0.25 \leq w/\lambda (=FF) \leq 0.60 \qquad (1)$$

A larger filling factor FF than the upper limit of the condition (1) increases the incident angle at which the reflectance for the p-polarized light becomes minimum to an angle outside the incident angle range, which makes it difficult to effectively reduce the reflectance for the p-polarized light entering within the incident angle range. Similarly, a smaller filling factor FF than the lower limit of the condition (1) decreases the incident angle at which the reflectance for the p-polarized light becomes minimum to an angle outside the incident angle range, which makes it difficult to effectively reduce the reflectance for the p-polarized light entering within the incident angle range. Such a filling factor FF that does not satisfy the condition (1) causes the p-polarized light that should be transmitted through the polarization beam splitting part 3 to be reflected thereby, which deteriorates polarization beam splitting characteristics of the polarization beam splitting part 3 and light utilization efficiency thereat.

In addition, the inventor found that, within the range between the lower limit and the upper limit of the condition (1), a large filling factor FF for a small grating period λ and a small filling factor FF for a large grating period λ provide good polarization beam splitting characteristics.

Moreover, in order that the wire grid 3a may have the polarization beam splitting characteristics, it is necessary to form the wire grid 3a with a smaller grating period than the wavelength of the entering beam. In particular, in order that the wire grid 3a may have good polarization beam splitting characteristics, it is desirable that the grating period be sufficiently smaller than the wavelength of the entering beam. For example, when a minimum wavelength of the entering beam is 400 nm, it is desirable that the grating period be set to 120 nm or less.

Furthermore, it is desirable that the grating thickness d and the grating width w satisfy the following condition (2):

$$d/w \leq 2.0 \qquad (2)$$

A higher value of d/w than the upper limit of the condition (2) excessively increases the grating thickness d with respect to the grating width w, which makes manufacturing of the grating difficult and lowers strength of the grating, thereby making it difficult to provide desired polarization beam splitting performance. Reducing the grating thickness so as to satisfy the condition (2) enables reduction of light absorption loss at the wire grid 3a.

The inter-grating portion 5 is formed of air or a dielectric material. The inter-grating portion 5 formed of the air provides better polarization beam splitting characteristics. However, considering easiness of manufacturing the grating, it is desirable that the inter-grating portion 5 be formed of the dielectric material. In this case, the dielectric material forming the inter-grating portion 5 may be same as that forming a dielectric film adjacent to the wire grid 3a among the multiple dielectric films constituting one or both of the entrance side multi-layered film layer 3c and the exit side multi-layered film layer 3b.

In this embodiment, the entrance side multi-layered film layer 3c and the exit side multi-layered film layer 3b are each formed of at least two dielectric films having mutually different refractive indices. A medium on the beam entrance side further than the entrance side multi-layered film layer 3c is referred to as "an entrance medium". The multiple dielectric films constituting each of the entrance side and exit side multi-layered film layers 3c and 3b include at least one dielectric film (dielectric layer) having a higher refractive index than that of the entrance medium and at least one dielectric film (dielectric layer) having a lower refractive index than that of the entrance medium. In this embodiment, the entrance medium is a material filling an inside of the prism 2, such as an optical glass.

In this embodiment, among the multiple dielectric films constituting each of the entrance side and exit side multi-layered film layers 3c and 3b, the at least one dielectric film having the higher refractive index than that of the entrance medium is denoted by "H" or "an H layer" as shown in FIG. 4 and others. On the other hand, the at least one dielectric film having the lower refractive index than that of the entrance medium is denoted by "L" or "an L layer". Furthermore, a highest refractive index of the refractive index (indices) of the at least one H layer is denoted by "nH", and a lowest refractive index of the refractive index (indices) of the at least one L layer is denoted by "nL". It is desirable that the highest refractive index nH and the lowest refractive index nL satisfy the following condition (3):

$$nH/nL > 1.4 \qquad (3)$$

Moreover, when an angle formed between a ray propagating in the dielectric film of the L layer and a normal to that L layer is defined as a refraction angle $\theta L$, it is desirable that nH, nL and $\theta L$ satisfy the following condition (4):

$$0.9 < (nL/nH) \times \tan \theta L < 1.1 \qquad (4)$$

The condition (3) is a condition for causing the s-polarized light to be reflected by an interface between the H layer and the L layer. A lower value of nH/nL than the lower limit of the condition (3) decreases the reflectance for the s-polarized light, which makes it difficult to provide good polarization beam splitting characteristics. The condition (4) is a condition for causing the interface between the H layer and the L layer to satisfy a condition of Brewster's angle with respect to a certain incident angle within the incident angle range.

Satisfaction of the conditions (3) and (4) makes it possible to provide a good polarization beam splitting function that transmits the p-polarized light of the beam entering the multi-layered film layers 3b and 3c and reflects the s-polarized light thereof. Such an effect can be achieved only by providing the entrance side multi-layered film layer 3c without providing the exit side multi-layered film layer 3b, so that a case of providing no exit side multi-layered film layer 3b to the polarization beam splitting part 3 is included in alternative embodiments. However, the exit side multi-layered film layer 3b can reflect a slight quantity of the s-polarized light which is not reflected by the entrance side multi-layered film layer 3c, so that the provision of the exit side multi-layered film layer 3b enables effective reduction of so-called leakage s-polarized light.

The polarization beam splitting part 3 thus configured enables the entrance side multi-layered film layer 3c and the exit side multi-layered film layer 3b to reflect part of the s-polarized light that should be reflected by the wire grid 3a, which makes it possible to significantly reduce the grating thickness of the wire grid 3a as compared with those of conventional ones. Such reduction of the grating thickness of the wire grid 3a enables reduction of the p-polarized light absorbed by the wire grid 3a. In other words, provision of the at least one dielectric film (dielectric layer) whose refractive index is higher than that of the entrance medium and the at least one dielectric film (dielectric layer) whose refractive index is lower than that of the entrance medium to the polarization beam splitting part 3 achieves a configuration reflecting the s-polarized light and transmitting the p-polarized light. Such a configuration of the polarization beam splitting part 3 causes the wire grid 3a to assist the reflection of the s-polarized light, which makes it possible to increase the reflectance for the s-polarized light. Moreover, provision of a layer (H layer) whose refractive index is high as a most-entrance medium side layer of the entrance side multi-layered film layer improves the polarization beam splitting characteristics, which is more desirable.

In general wire grids, the grating thicknesses are often set to 100 nm or more in order to provide a sufficient reflection characteristic for the s-polarized light. On the other hand, in this embodiment, even though the grating thickness of the wire grid 3a is set to 50 nm or less, it is possible to provide a reflectance of 90% or more for the s-polarized light.

Moreover, in order that the polarization beam splitting part 3 may provide a good angular characteristic, it is desirable that, in each of the entrance side multi-layered film layer 3c and the exit side multi-layered film layer 3b, the dielectric film adjacent to the wire grid 3a be a dielectric film whose refractive index is lowest.

In addition, the entrance side and exit side multi-layered film layers 3c and 3b may be asymmetrically configured with respect to the wire grid 3a. On the other hand, when the entrance side and exit side multi-layered film layers 3c and 3b are symmetrically configured with respect to the wire grid 3a, optical characteristics of the polarization beam splitting part 3 in a case where a beam enters thereinto from the prism 2 are equal to those in a case where the beam enters thereinto from the prism 1. Thus, a degree of freedom in configuration of an optical system using the polarization beam splitting element is increased.

Embodiment 1

FIG. 3 shows a configuration of a polarization beam splitting part 3 of a polarization beam splitting element that is a first embodiment (Embodiment 1) of the present invention. Prisms (not shown, but corresponding to the prisms 1 and 2 shown in FIG. 1) have a refractive index of 1.75. An entrance side multi-layered film layer and an exit side multi-layered film layer (respectively corresponding to the entrance side and exit side multi-layered film layers 3c and 3b shown in FIG. 2A) are each constituted by two types of layers, that is, H and L layers alternately disposed, the H layer having a higher refractive index than that of the prism (2) and the L layer having a lower refractive index than that of the prism (2).

Specifically, the polarization beam splitting part 3 in this embodiment has a configuration including, in order from its beam entrance side, HLHLHL-wire grid-LHLH. In each of the entrance side and exit side multi-layered film layers, a dielectric film adjacent to the wire grid 3a is the L layer. In this embodiment, all the H layers have a same refractive index of nH, and all the L layers have a same refractive index of nL.

Table 1 shows refractive indices and thicknesses of the respective layers in this embodiment. A metal forming the wire grid 3a is aluminum. In the wire grid 3a, a grating thickness is 25 nm, a filling factor FF is 0.45, and a grating period is 100 nm. A medium between the gratings (that is, a medium forming inter-grating portions) is air.

Figure 4A:
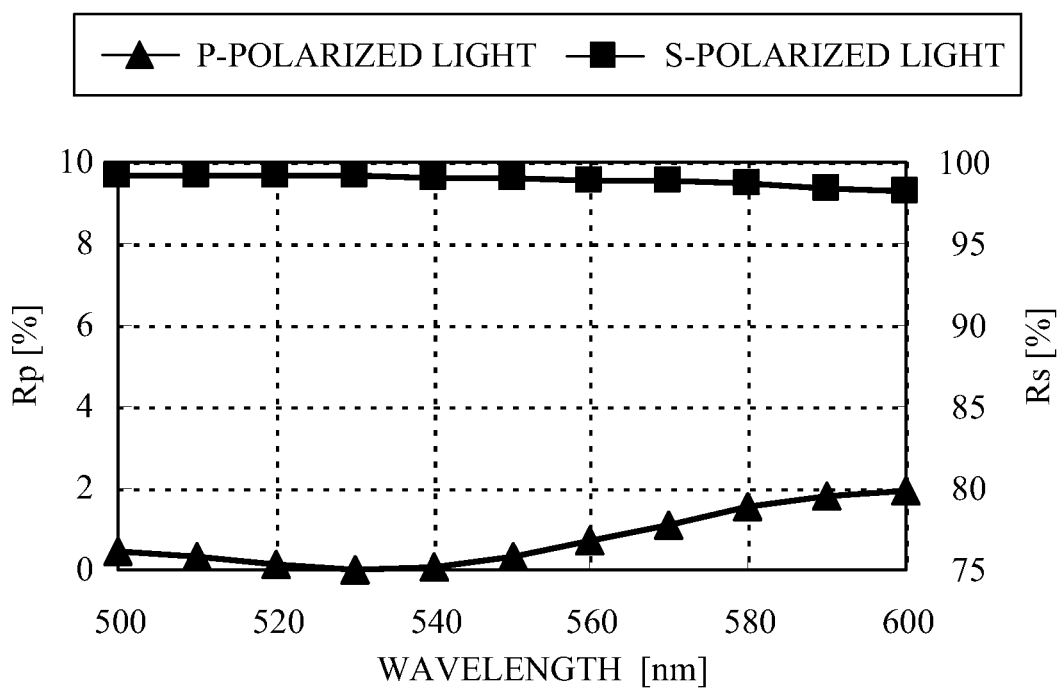
FIGS. 4A to 4C show characteristics of the polarization beam splitting part in Embodiment 1.
Figure 4B:
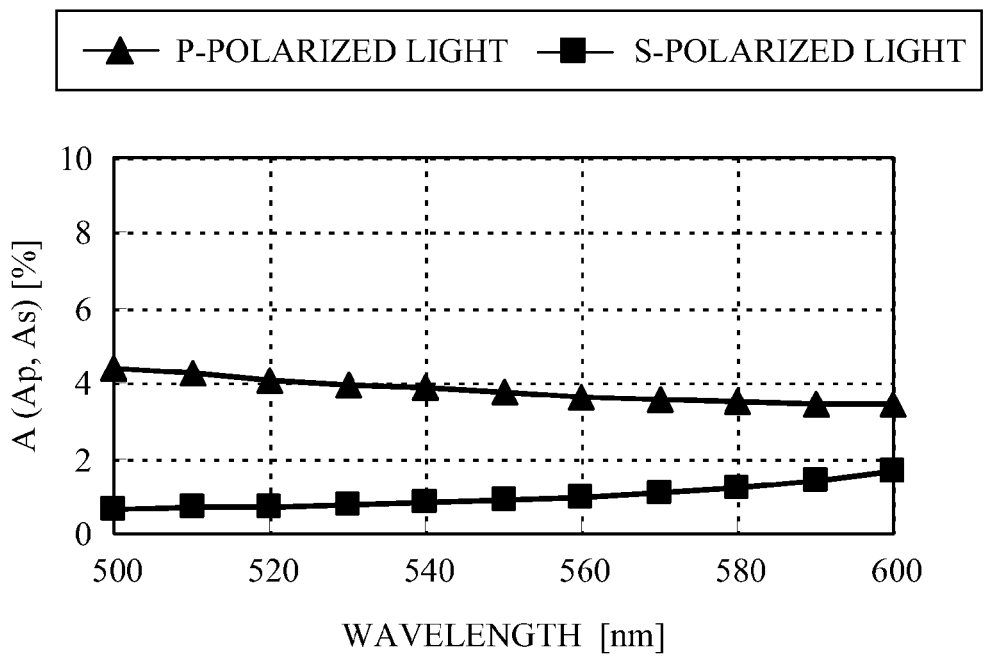

FIG. 4A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 4B shows the absorption losses for the s-polarized light and the p-polarized light at the various wavelengths.

A first vertical axis (left vertical axis) in FIG. 4A shows the reflectance Rp for the p-polarized light and a second vertical axis (right vertical axis) shows the reflectance Rs for the s-polarized light. A vertical axis in FIG. 4B shows the absorption loss A. Horizontal axes in these figures show the wavelength.

As shown in FIGS. 4A and 4B, the polarization beam splitting part 3 in Embodiment 1 has, in a wavelength range from 500 nm to 600 nm, a higher reflectance Rs for the s-polarized light than 95% (Rs>95%) and lower absorption losses As and Ap for the s-polarized light and the p-polarized light than 5% (As<5% and Ap<5%), which shows an excellent characteristic.

Figure 4C:
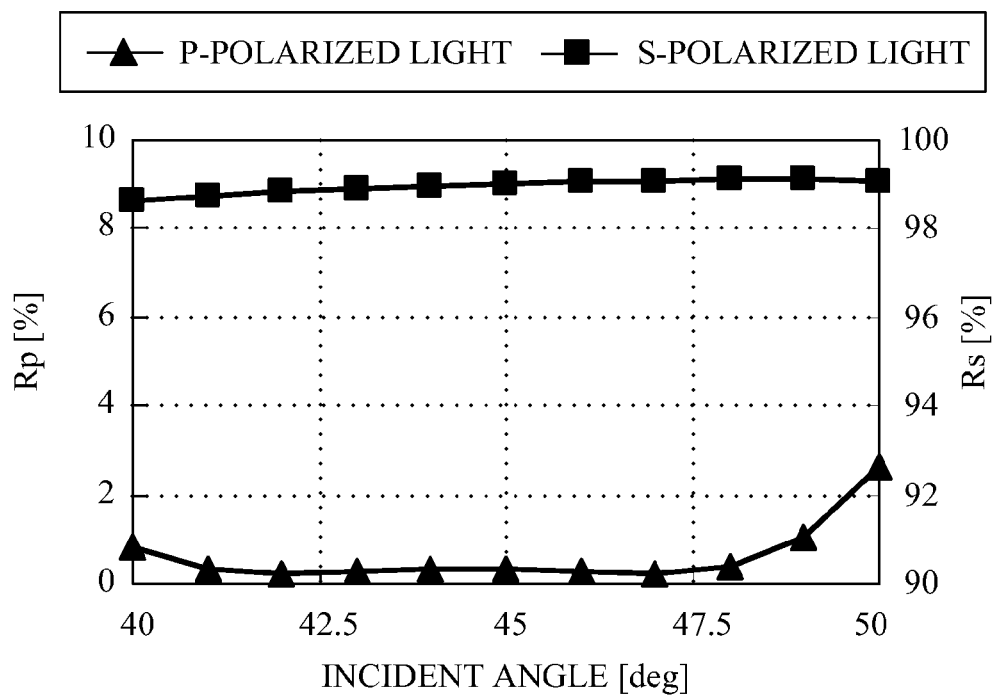

FIG. 4C shows incident angle characteristics of the reflectances Rp and Rs of the polarization beam splitting part 3 for the p-polarized light and the s-polarized light at a wavelength of 550 nm. A first vertical axis in FIG. 4C shows the reflectance Rp for the p-polarized light, and a second vertical axis shows the reflectance Rs for the s-polarized light. A horizontal axis shows the wavelength. The incident angle is an angle formed between a ray and the perpendicular direction to the surface of the polarization beam splitting part 3 in the prism 2: the incident angle is 0° when the ray enters the surface in the perpendicular direction. As understood from FIG. 4C, Embodiment 1 is optimized such that the reflectance Rp for the p-polarized light becomes sufficiently low when the incident angle in the prism 2 is 45 degrees or thereabout.

Although Embodiment 1 shows the multi-layered film layer formed of only two types of dielectric films (H and L layers), a multi-layered film layer may be used which includes another dielectric film(s) whose refractive index is different from those of the two types of dielectric films.

Comparative Example 1

Figure 17A:
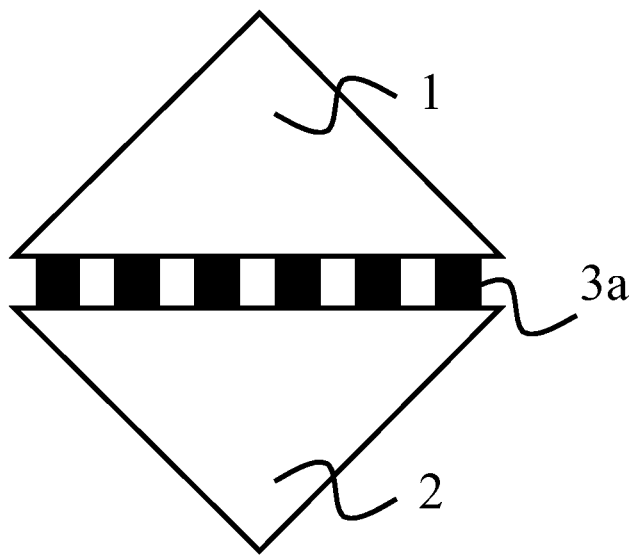
FIGS. 17A to 17C show a configuration and characteristics of a polarization beam splitting element of Comparative Example 1.

FIG. 17A shows a polarization beam splitting element that is a first comparative example (Comparative Example 1). This polarization beam splitting element is constituted by prisms 1 and 2 and a polarization beam splitting part disposed therebetween: the polarization beam splitting part is constituted by only a wire grid 3a. Parameters of the wire grid 3a and a refractive index of the prisms 1 and 2 are same as those in Embodiment 1.

Figure 17B:
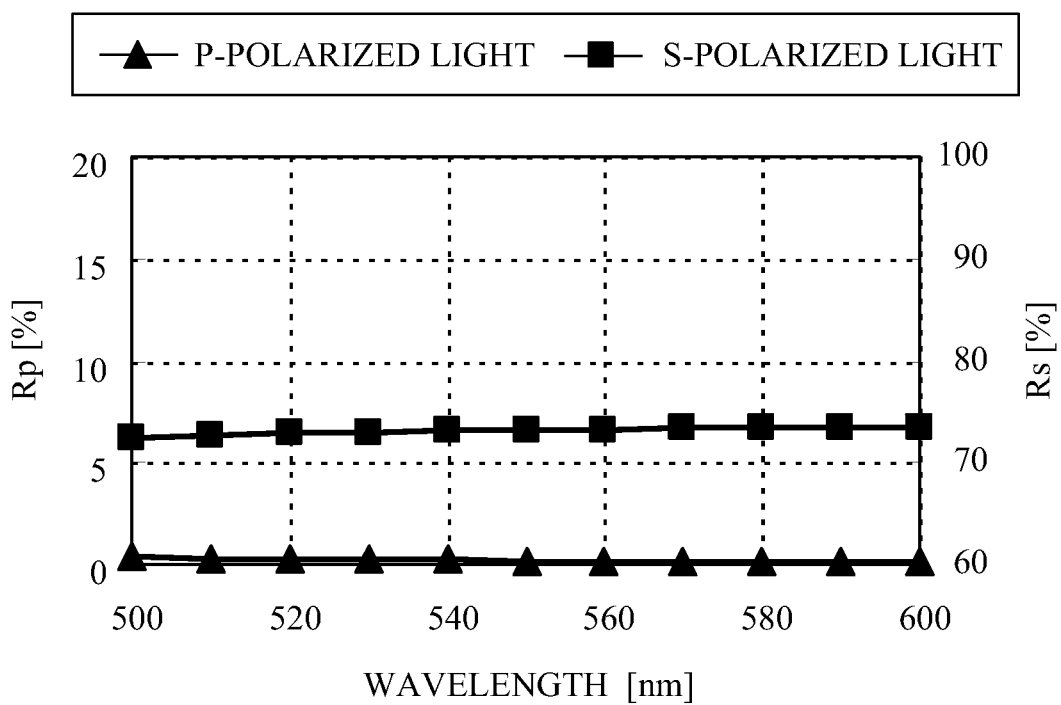
Figure 17C:
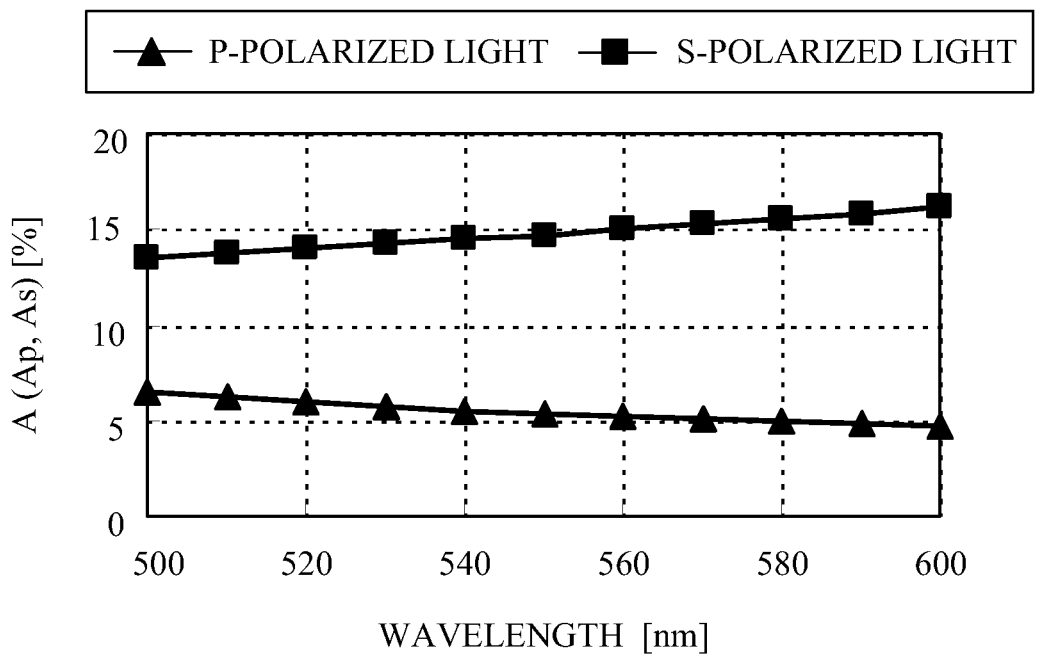

FIG. 17B shows reflectances of the polarization beam splitting part (3a) for the s-polarized light and the p-polarized light at various wavelengths when an entering beam enters an entrance surface of the prism 2 perpendicularly thereto (that is, the entering beam enters the polarization beam splitting part from a direction forming an angle of 45 degrees with respect to a perpendicular direction to a surface of the polarization beam splitting part). FIG. 17C shows absorption losses for the s-polarized light and the p-polarized light at the various wavelengths. Vertical axes and horizontal axes in FIGS. 17B and 17C are the same as those in FIGS. 4A and 4B, which applies to other comparative examples described later.

As understood from FIG. 17B, the reflectance Rs for the s-polarized light is lower than 75% (Rs<75%), which shows that the configuration including no multi-layered film layer and including the wire grid 3a whose grating thickness is thin cannot provide a sufficient reflectance for the s-polarized light. Moreover, as shown in FIG. 17C, the absorption losses for the s-polarized light and the p-polarized light are both larger than those in Embodiment 1. This is because, since whole of the s-polarized light whose part is reflected by the entrance side multi-layered film layer in Embodiment 1 enters the wire grid 3a and thereby the quantity of the s-polarized light entering the wire grid 3a is increased than Embodiment 1, the quantity of the s-polarized light being absorbed by the wire grid 3a is also increased.

The absorption loss of the p-polarized light is increased because, since reflection at an interface between the wire grid 3a and the exit side prism 1 is increased and thereby multiple reflection is easily caused, the p-polarized light being absorbed by the wire grid 3a is increased.

Thus, the configuration including the polarization beam splitting part constituted only by the wire grid whose grating thickness is thin reduces the reflectance for the s-polarized light and increases the absorption loss therefor, which decreases light utilization efficiency and makes it difficult to achieve such a low-loss polarization beam splitting element that is described in Embodiment 1.

Comparative Example 2

Figure 18A:
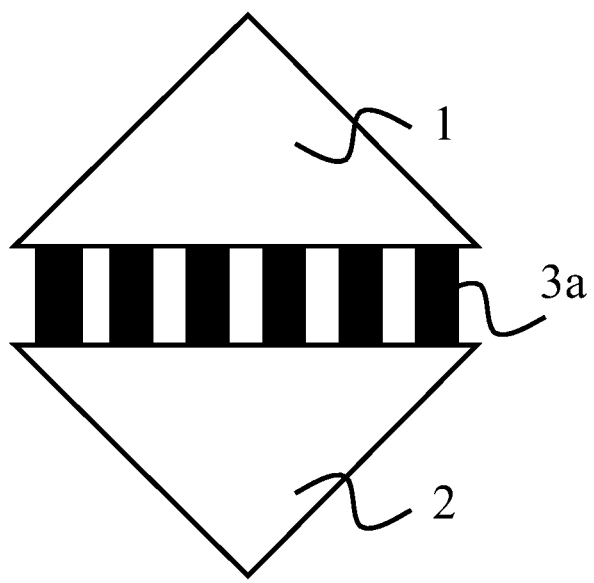
FIGS. 18A to 18C show a configuration and characteristics of a polarization beam splitting element of Comparative Example 2.

FIG. 18A shows a polarization beam splitting element that is a second comparative example (Comparative Example 2). This polarization beam splitting element is constituted by, as well as Comparative Example 1, prisms 1 and 2 and a polarization beam splitting part disposed therebetween: the polarization beam splitting part is constituted by only a wire grid 3a. A grating thickness of the wire grid 3a is increased to 100 nm as compared with that in Embodiment 1. Other parameters of the wire grid 3a and a refractive index of the prisms 1 and 2 are same as those of Embodiment 1.

Figure 18B:
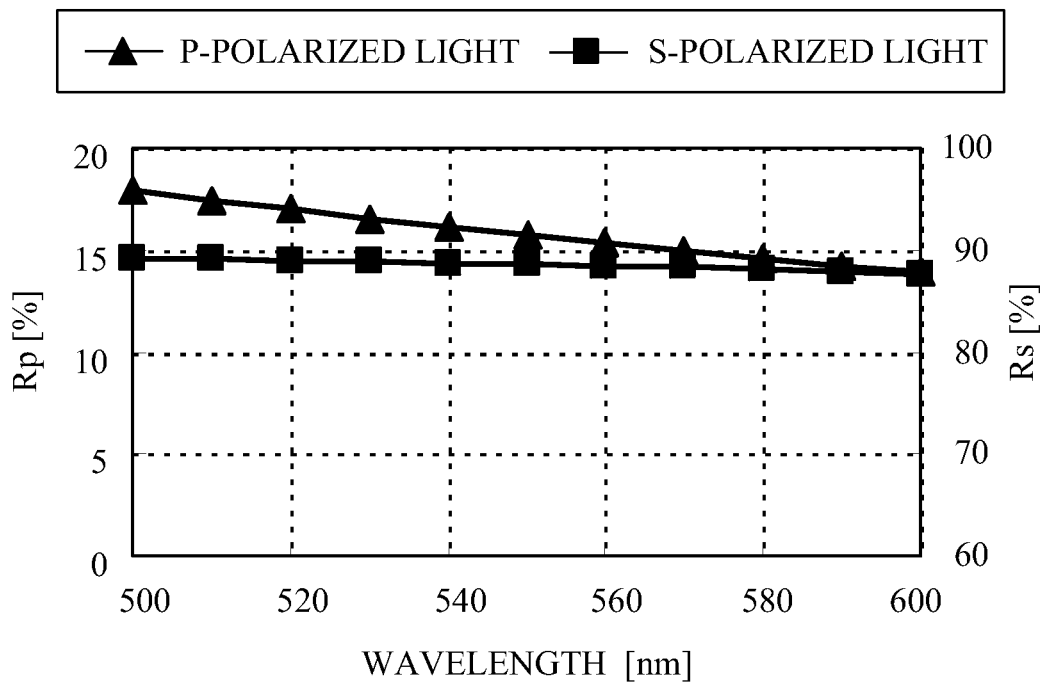
Figure 18C:
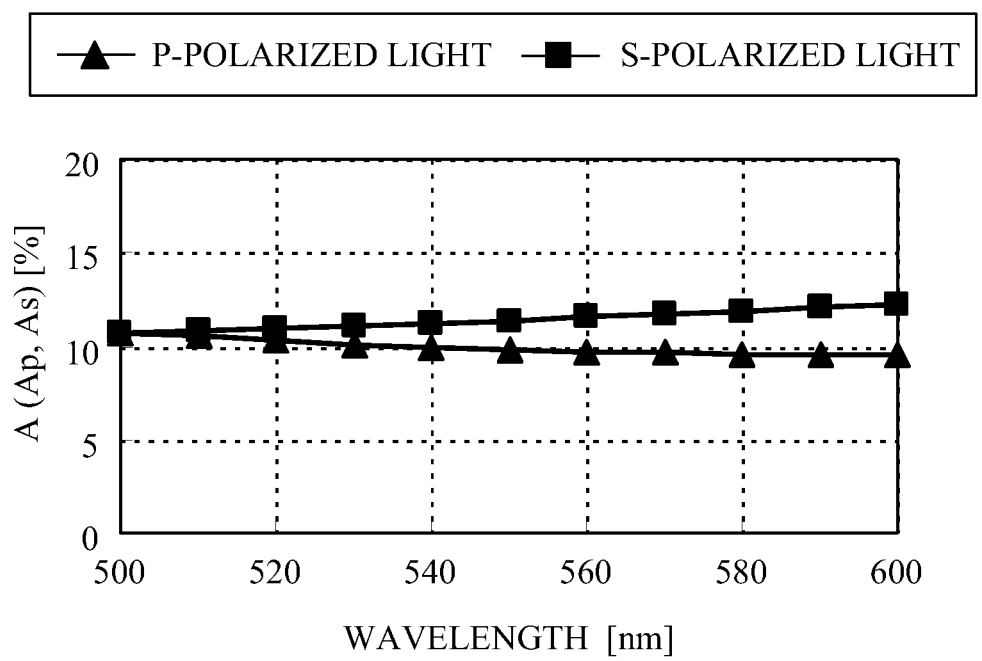

FIG. 18B shows reflectances of the polarization beam splitting part (3a) for the s-polarized light and the p-polarized light at various wavelengths when an entering beam enters an entrance surface of the prism 2 perpendicularly thereto. FIG. 18C shows absorption losses for the s-polarized light and the p-polarized light at the various wavelengths.

As shown in FIG. 18B, the increase of the grating thickness of the wire grid 3a increases the reflectance for the p-polarized light to about 15%. The reflectance for the s-polarized light is about 90%, which is higher than that of Comparative Example 1, but is lower than that of Embodiment 1 by about 10%.

Moreover, as understood from FIG. 18C, the absorption losses for the s-polarized light and the p-polarized light are larger than those of Embodiment 1. The absorption loss for the p-polarized light is increased because the increase of the grating thickness of the wire grid 3a increases the quantity of the s-polarized light being absorbed when being transmitted therethrough. On the other hand, the absorption loss for the s-polarized light is increased because, as in Comparative Example 1, the quantity of the s-polarized light entering the wire grid 3a is increased.

Thus, when the configuration including the polarization beam splitting part constituted only by the wire grid, even though the grating thickness of the wire grid is increased in order to increase the reflectance for the s-polarized light, a higher reflectance than that of Embodiment 1 cannot be provided. Moreover, the increase of the grating thickness increases not only the reflectance for the p-polarized light, but also the absorption loss therefor. Accordingly, it is difficult to achieve such a low-loss polarization beam splitting element that is described in Embodiment 1.

Comparative Example 3

Figure 19A:
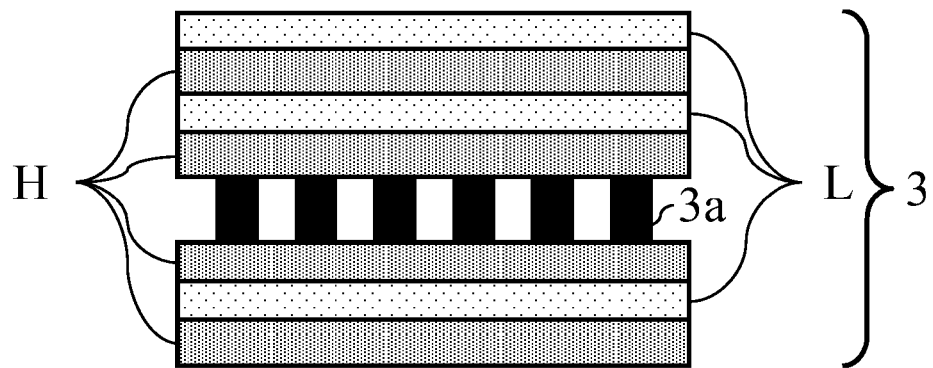
FIGS. 19A and 19B show a configuration and characteristics of a polarization beam splitting element of Comparative Example 3.

FIG. 19A shows a configuration of a polarization beam splitting part 3 of a polarization beam splitting element that is a third comparative example (Comparative Example 3). In Comparative Example 3, the polarization beam splitting part 3 includes, in order from a beam entrance side, LHLH-(wire grid)-HLH in which an H layer having a high refractive index is adjacent to the wire grid 3a. Table 7 shows refractive indices and thicknesses of the respective layers. A filling factor FF of the wire grid 3a is 0.3. Other parameters of the wire grid 3a and a refractive index of prisms (not shown) are same as those of Embodiment 1.

Figure 19B:
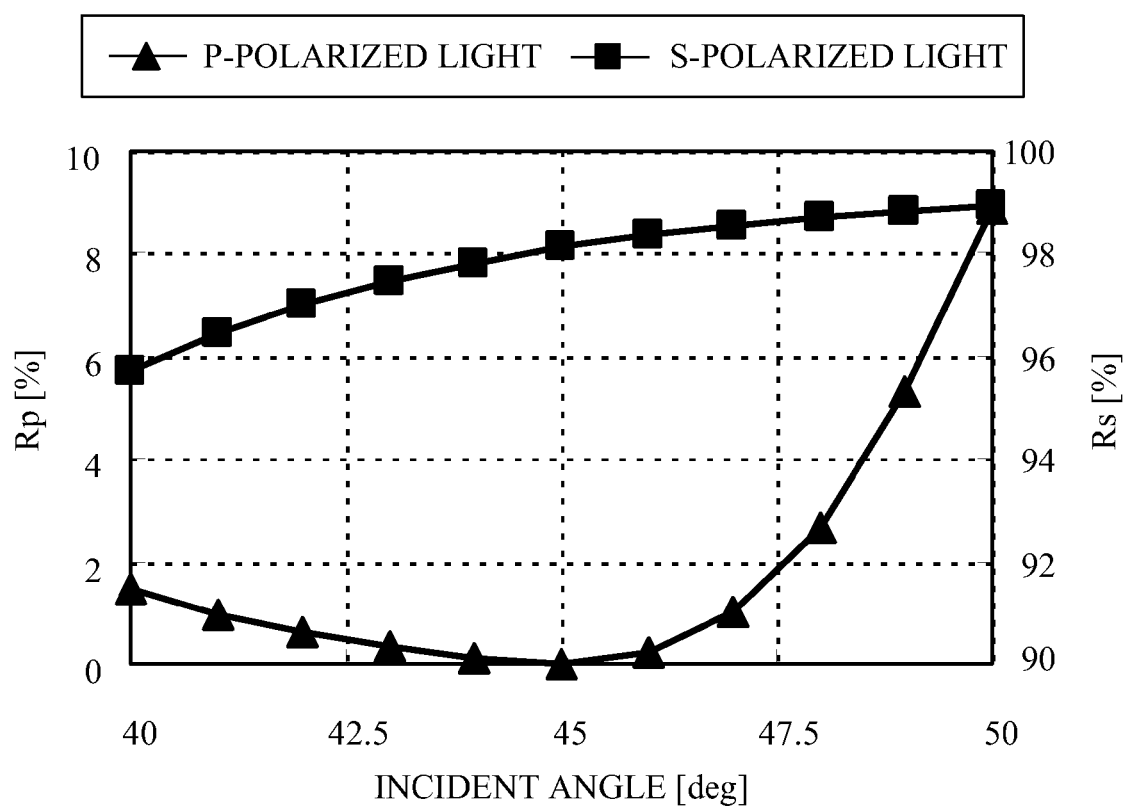

FIG. 19B shows incident angle characteristics of reflectances of the polarization beam splitting part 3 for the p-polarized light and the s-polarized light at a wavelength of 550 nm. As understood from FIG. 19B, this comparative example is optimized, as well as Embodiment 1, such that the reflectance for the p-polarized light is minimized at an incident angle of 45° or thereabout in the prism. However, as compared with Embodiment 1, variations of the reflectances for the p-polarized light and the s-polarized light according to the incident angle are larger.

Thus, the configuration in which a dielectric film adjacent to the wire grid is the H layer whose refractive index is high decreases the incident angle characteristics as compared with a case where the dielectric film adjacent to the wire grid is the L layer whose refractive index is low, which causes decrease of polarization beam splitting characteristics when using the polarization beam splitting element with a wide incident angle range. Therefore, it is desirable that the dielectric film adjacent to the wire grid have a low refractive index, in other words, it is desirable that the dielectric film adjacent to the wire grid be the L layer.

Embodiment 2

Figure 5:
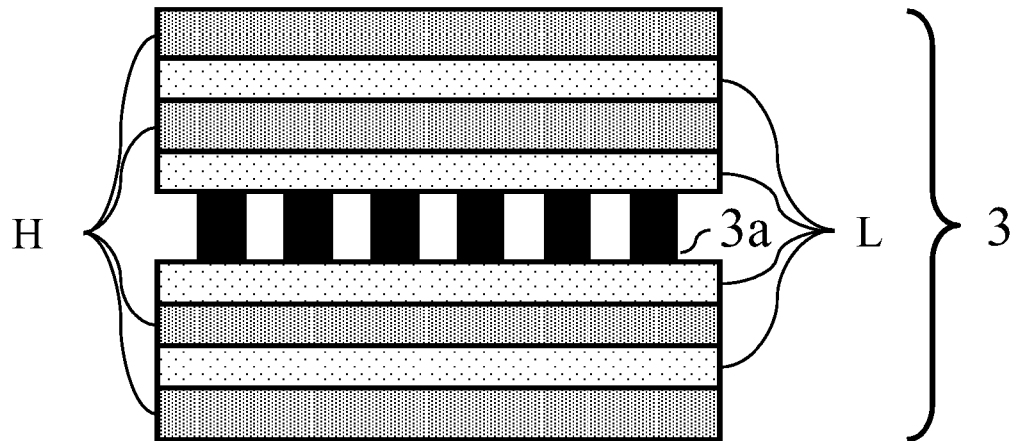
FIG. 5 shows a configuration of a polarization beam splitting part of a polarization beam splitting element that is Embodiment 2 of the present invention.

FIG. 5 shows a configuration of a polarization beam splitting part 3 of a polarization beam splitting element that is a second embodiment (Embodiment 2) of the present invention. Also in this embodiment, a refractive index of two prisms (not shown, but similar to the prisms 1 and 2 in Embodiment 1) is 1.75.

The polarization beam splitting part 3 has a configuration including, when a dielectric film having a higher refractive index than that of the prism (2) as an entrance medium is denoted by "H" and a dielectric film having a lower refractive index than that of the entrance medium is denoted by "L", in order from its beam entrance side, HLHL-(wire grid)-LHLH. Table 2 shows refractive indices and thicknesses of the respective layers. The wire grid 3a is formed of aluminum. In the wire grid 3a, a grating thickness is 18 nm, a filling factor FF is 0.40, and a grating period is 100 nm. A medium forming inter-grating portions is air.

Figure 6A:
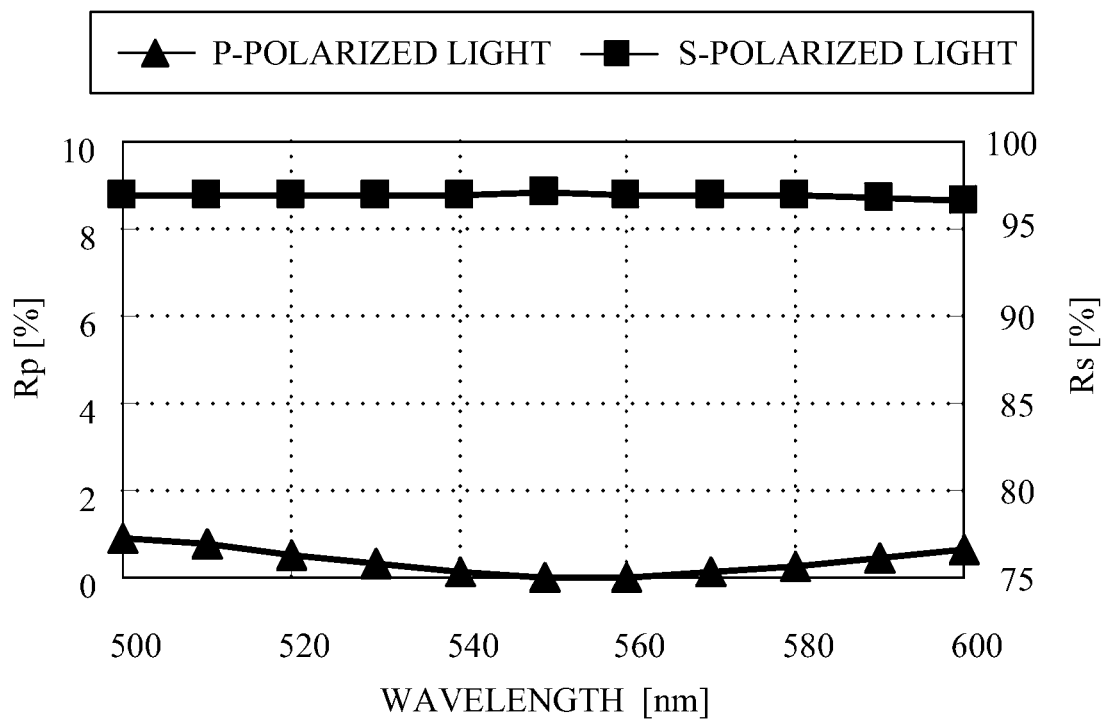
FIGS. 6A and 6B show characteristics of the polarization beam splitting part in Embodiment 2.
Figure 6B:
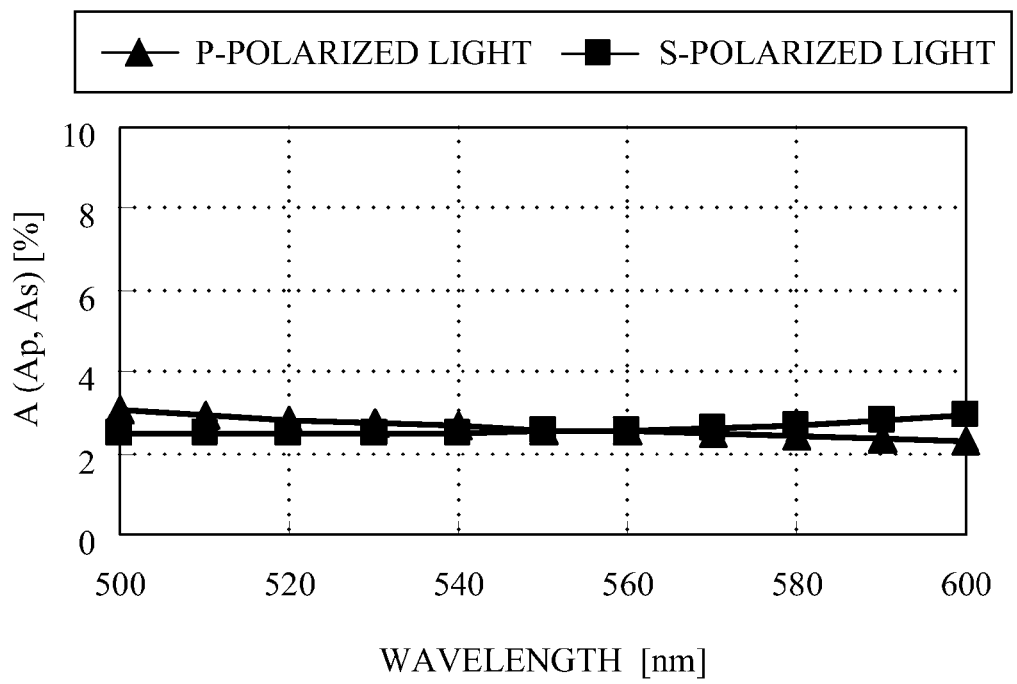

FIG. 6A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 6B shows absorption losses for the s-polarized light and the p-polarized light at the various wavelengths. Vertical axes and horizontal axes in FIGS. 6B and 6C are the same as those in FIGS. 4A and 4B, which applies to other embodiments described later.

As shown in FIGS. 6A and 6B, the polarization beam splitting part 3 in Embodiment 2 has, in a wavelength range from 500 nm to 600 nm, a higher reflectance Rs for the s-polarized light than 95% (Rs>95%) and lower absorption losses As and Ap for the s-polarized light and the p-polarized light than 5% (As<5% and Ap<5%), which shows an excellent characteristic.

The polarization beam splitting part 3 in Embodiment 2 includes the entrance side and exit side multi-layered film layers formed so as to have a symmetric configuration with respect to the wire grid 3a. That is, the entrance side and exit side multi-layered film layers are each constituted by four layers of LHLH in order from its wire grid side. Such a symmetric configuration provides same optical characteristics even in cases where the entering beam enters from both the multi-layered film layers, which makes it possible to increase a degree of freedom in layout of the polarization beam splitting element of Embodiment 2 when that polarization beam splitting element is used as part of an optical system.

Embodiment 3

Figure 7:
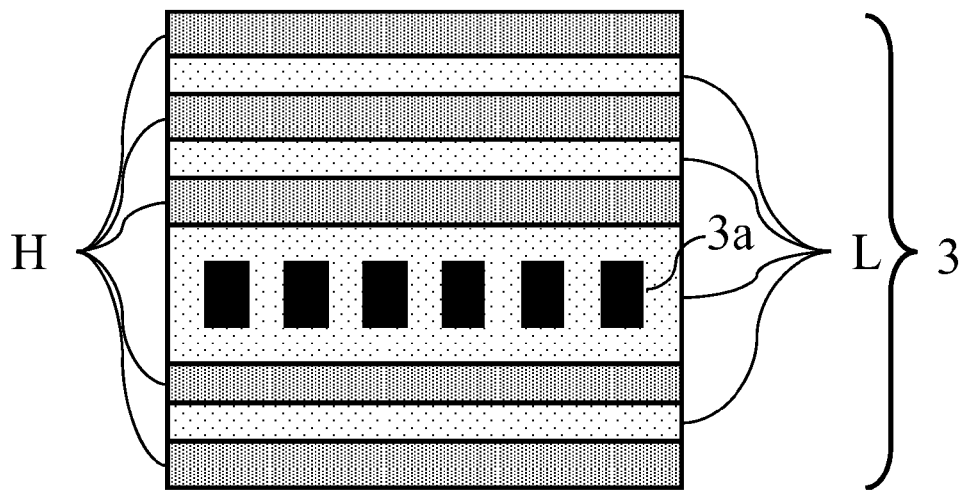
FIG. 7 shows a configuration of a polarization beam splitting part of a polarization beam splitting element that is Embodiment 3 of the present invention.

FIG. 7 shows a configuration of a polarization beam splitting part 3 of a polarization beam splitting element that is a third embodiment (Embodiment 3) of the present invention. Also in this embodiment, a refractive index of two prisms (not shown, but similar to those in Embodiment 1) is 1.75.

The polarization beam splitting part 3 has a configuration including, in order from its beam entrance side, HLHLHL-(wire grid)-LHLH. Table 3 shows refractive indices and thicknesses of the respective layers. The wire grid 3a is formed of aluminum. In the wire grid 3a, a grating thickness is 32 nm, a filling factor FF is 0.37, and a grating period is 100 nm. A medium forming inter-grating portions is a same dielectric material as that forming the L layer.

Figure 8A:
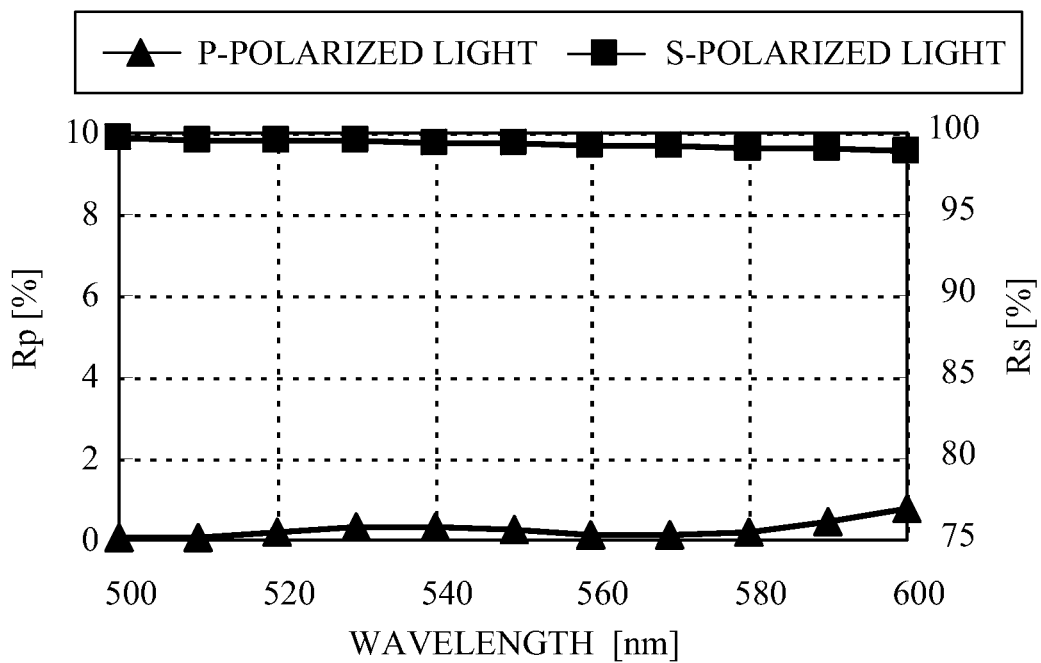
FIGS. 8A and 8B show characteristics of the polarization beam splitting part in Embodiment 3.
Figure 8B:
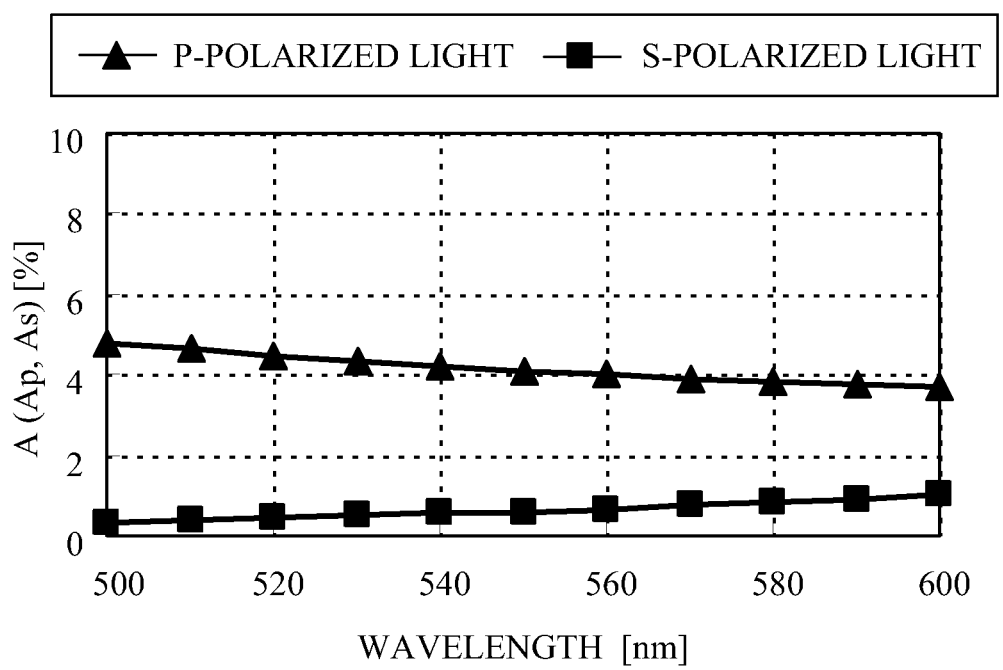

FIG. 8A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 8B shows absorption losses for the s-polarized light and the p-polarized light at the various wavelengths.

As shown in FIGS. 8A and 8B, the polarization beam splitting part 3 in Embodiment 3 has, in a wavelength range from 500 nm to 600 nm, a higher reflectance Rs for the s-polarized light than 95% (Rs>95%) and lower absorption losses As and Ap for the s-polarized light and the p-polarized light than 5% (As<5% and Ap<5%), which shows an excellent characteristic.

In this embodiment, as described above, the L layer adjacent to the wire grid 3a and the medium (inter-grating portions) between the gratings are formed of the same dielectric material. Employing such a configuration makes it possible to more easily manufacture the polarization beam splitting part 3 (that is, the polarization beam splitting element) as compared with the medium between the gratings is air. For example, in the manufacturing of the polarization beam splitting part 3, one of the multi-layered film layers and the wire grid 3a are formed on a surface of one of the prisms (1 and 2), and then spaces between the gratings are filled with the dielectric material. Thereafter, a thin film made of the same dielectric material as the dielectric material filling the spaces is formed thereon. Each space between the gratings may be entirely filled with the dielectric material or may be partially filled therewith such that a gap remains. The manufacturing method of the polarization beam splitting part 3 is not limited to the above-described one.

Figure 9:
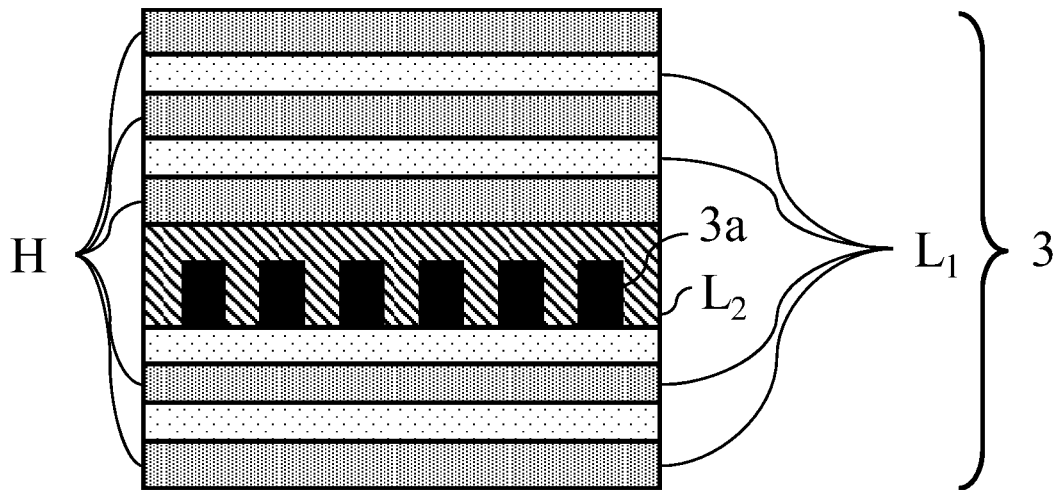
FIG. 9 shows a modified example of Embodiment 3.

Embodiment 3 has described the case where, in each of the entrance side and exit side multi-layered film layers, the L layer is adjacent to the wire grid and the same dielectric material as that the L layer is disposed between the gratings. However, a configuration shown in FIG. 9 may be employed in which, only in one of the entrance side and exit side multi-layered film layers, the L layer is adjacent to the wire grid and the same dielectric material as that the L layer is disposed between the gratings.

Embodiment 4

Figure 10:
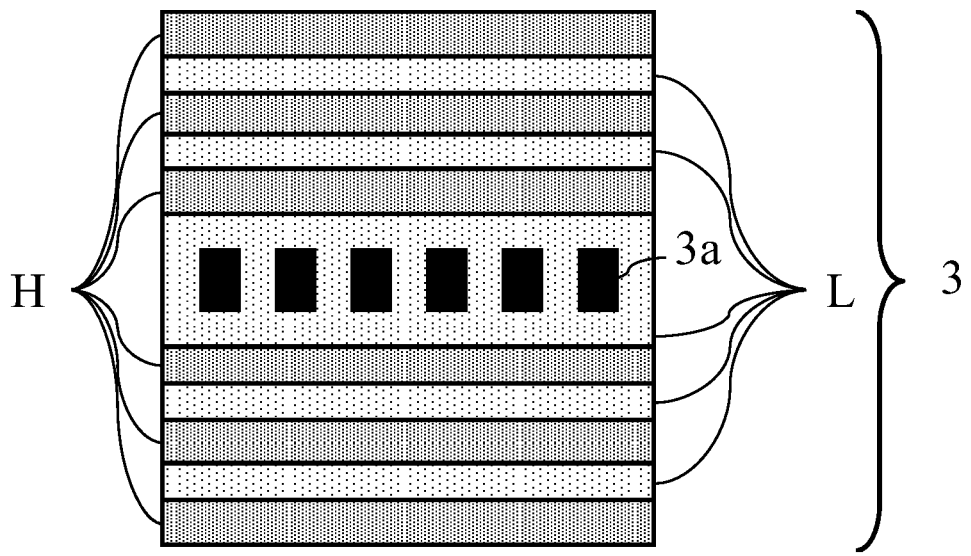
FIG. 10 shows a configuration of a polarization beam splitting part of a polarization beam splitting element that is Embodiment 4 of the present invention.

FIG. 10 shows a configuration of a polarization beam splitting part 3 of a polarization beam splitting element that is a fourth embodiment (Embodiment 4) of the present invention. In this embodiment, a refractive index of two prisms (not shown, but similar to the prisms 1 and 2 in Embodiment 1) is 1.8.

The polarization beam splitting part 3 has a configuration including, in order from its beam entrance side, HLHLHL-(wire grid)-LHLHLH. Table 4 shows refractive indices and thicknesses of the respective layers. The wire grid 3a is formed of aluminum. In the wire grid 3a, a grating thickness is 30 nm, a filling factor FF is 0.35, and a grating period is 100 nm. A medium forming inter-grating portions is a same dielectric material as that forming the L layer.

Figure 11A:
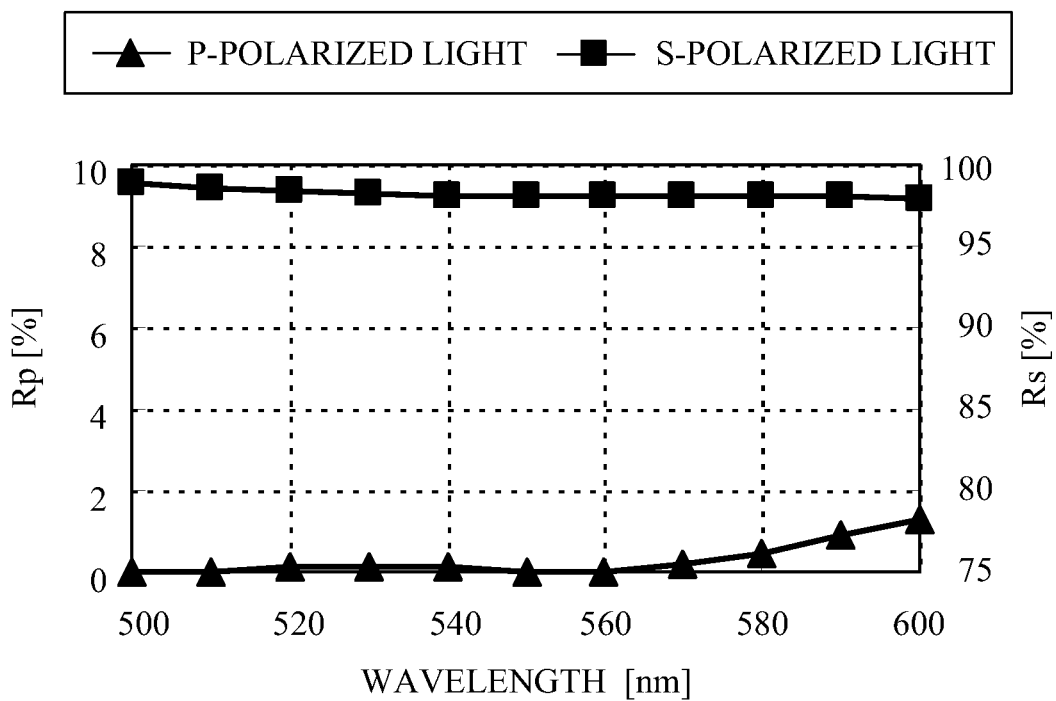
FIGS. 11A and 11B show characteristics of the polarization beam splitting part in Embodiment 4.
Figure 11B:
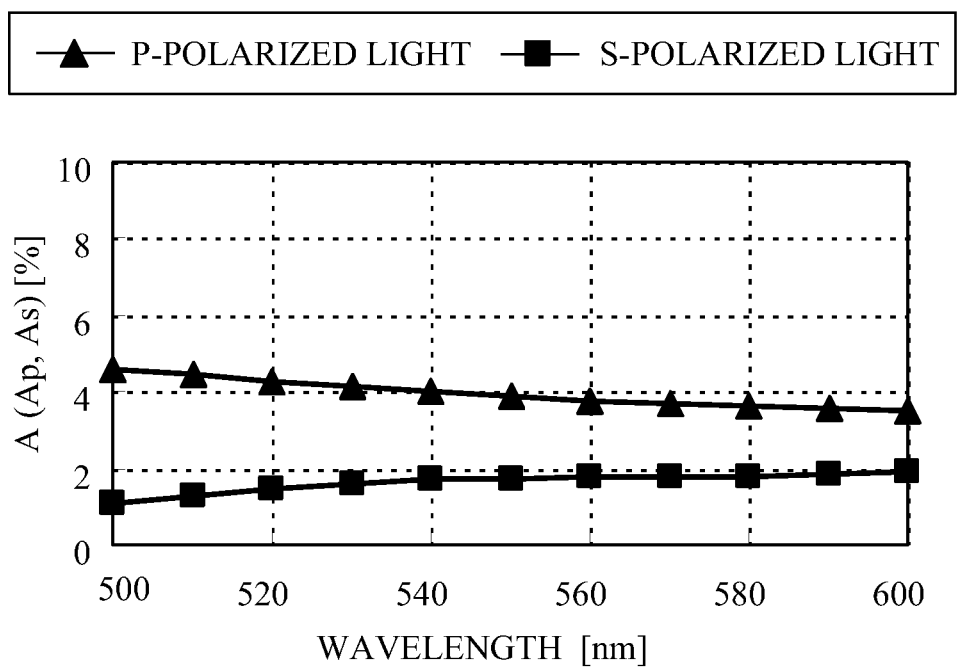

FIG. 11A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 11B shows absorption losses for the s-polarized light and the p-polarized light at the various wavelengths.

As shown in FIGS. 11A and 11B, the polarization beam splitting part 3 in Embodiment 4 has, in a wavelength range from 500 nm to 600 nm, a higher reflectance Rs for the s-polarized light than 95% (Rs>95%) and lower absorption losses As and Ap for the s-polarized light and the p-polarized light than 5% (As<5% and Ap<5%), which shows an excellent characteristic.

Embodiment 5

Figure 12:
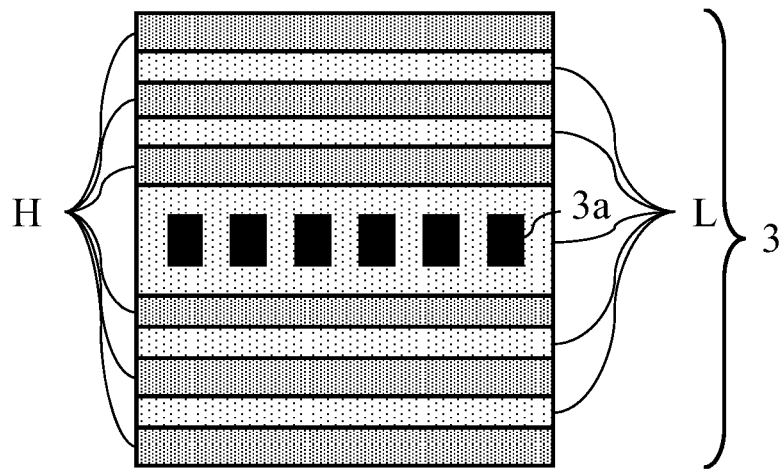
FIG. 12 shows a configuration of a polarization beam splitting part of a polarization beam splitting element that is Embodiment 5 of the present invention.

FIG. 12 shows a configuration of a polarization beam splitting part 3 of a polarization beam splitting element that is a fifth embodiment (Embodiment 5) of the present invention. In this embodiment, a refractive index of two prisms (not shown, but similar to the prisms 1 and 2 in Embodiment 1) is 1.6.

The polarization beam splitting part 3 has a configuration including, in order from its beam entrance side, HLHLHL-(wire grid)-LHLHLH. Table 5 shows refractive indices and thicknesses of the respective layers. The wire grid 3a is formed of aluminum. In the wire grid 3a, a grating thickness is 34 nm, a filling factor FF is 0.35, and a grating period is 100 nm. A medium forming inter-grating portions is a same dielectric material as that forming the L layer.

Figure 13A:
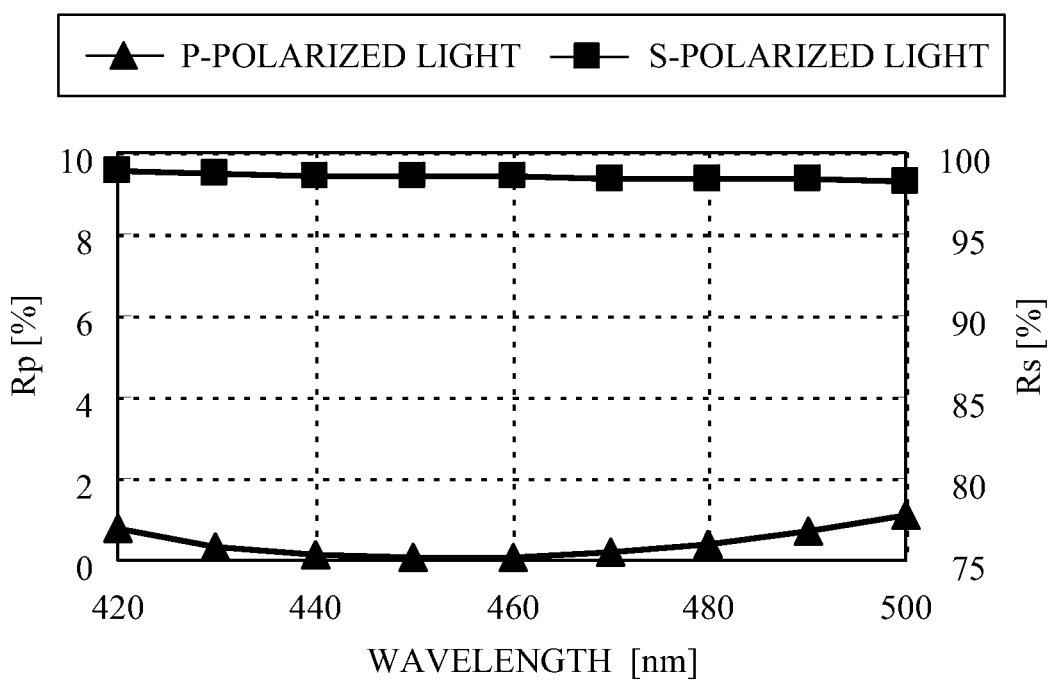
FIGS. 13A and 13B show characteristics of the polarization beam splitting part in Embodiment 5.
Figure 13B:
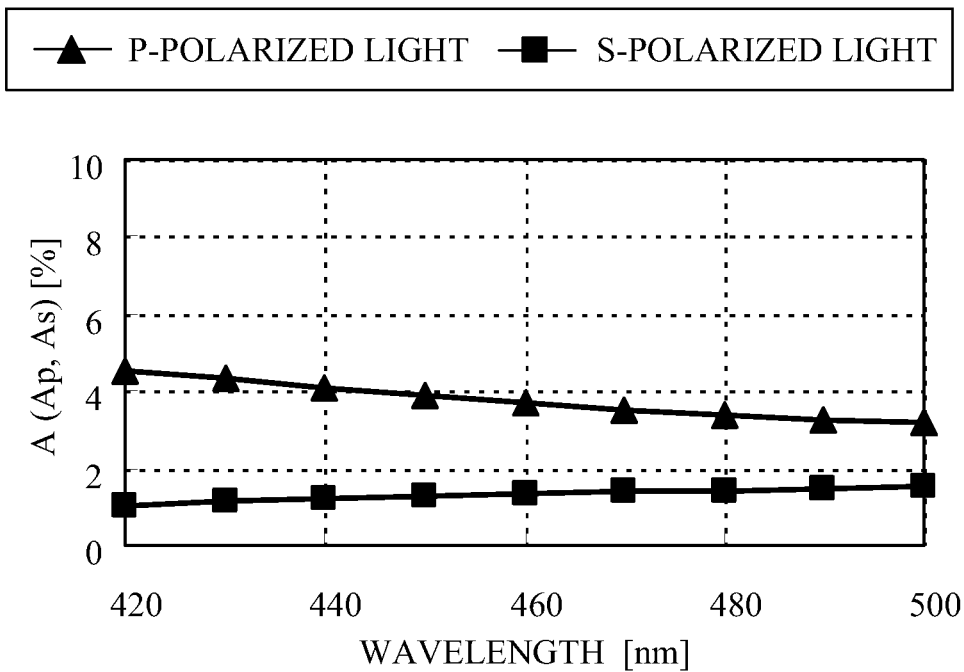

FIG. 13A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 13B shows absorption losses for the s-polarized light and the p-polarized light at the various wavelengths.

As shown in FIGS. 13A and 13B, the polarization beam splitting part 3 in Embodiment 5 has, in a wavelength range from 420 nm to 500 nm, a higher reflectance Rs for the s-polarized light than 95% (Rs>95%) and lower absorption losses As and Ap for the s-polarized light and the p-polarized light than 5% (As<5% and Ap<5%), which shows an excellent characteristic.

Embodiment 6

Figure 14:
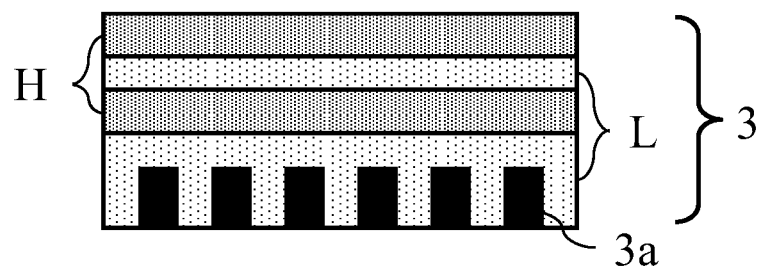
FIG. 14 shows a configuration of a polarization beam splitting part of a polarization beam splitting element that is Embodiment 6 of the present invention.

FIG. 14 shows a configuration of a polarization beam splitting part 3 of a polarization beam splitting element that is a sixth embodiment (Embodiment 6) of the present invention. In this embodiment, a refractive index of two prisms (not shown, but similar to those in Embodiment 1) is 1.6.

The polarization beam splitting part 3 has a configuration including, in order from its beam entrance side, HLHL-(wire grid). That is, the polarization beam splitting part 3 in this embodiment has the entrance side multi-layered film layer but no exit side multi-layered film layer.

Table 6 shows refractive indices and thicknesses of the respective layers. The wire grid 3a is formed of aluminum. In the wire grid 3a, a grating thickness is 45 nm, a filling factor FF is 0.42, and a grating period is 100 nm. A medium forming inter-grating portions is a same dielectric material as that forming the L layer.

Figure 15A:
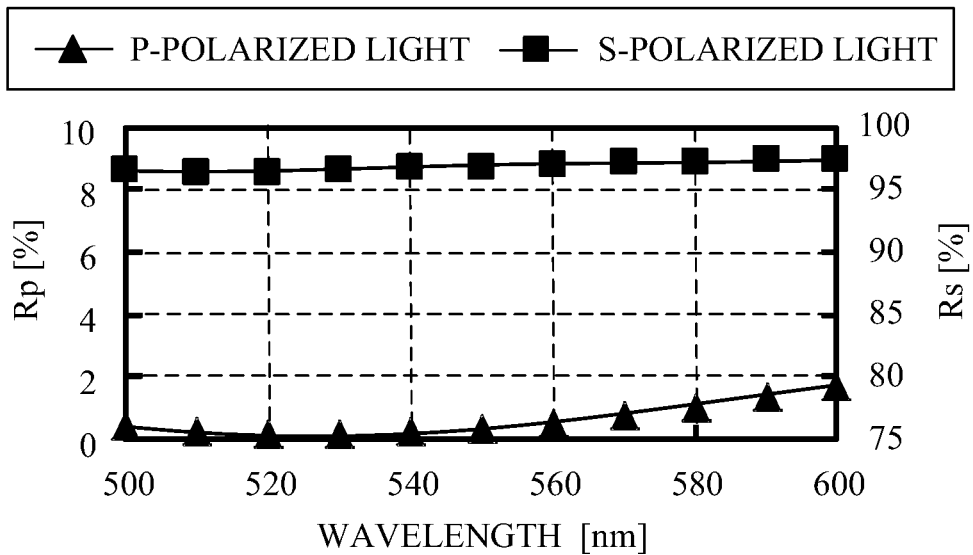
FIGS. 15A and 15B show characteristics of the polarization beam splitting part in Embodiment 6.
Figure 15B:
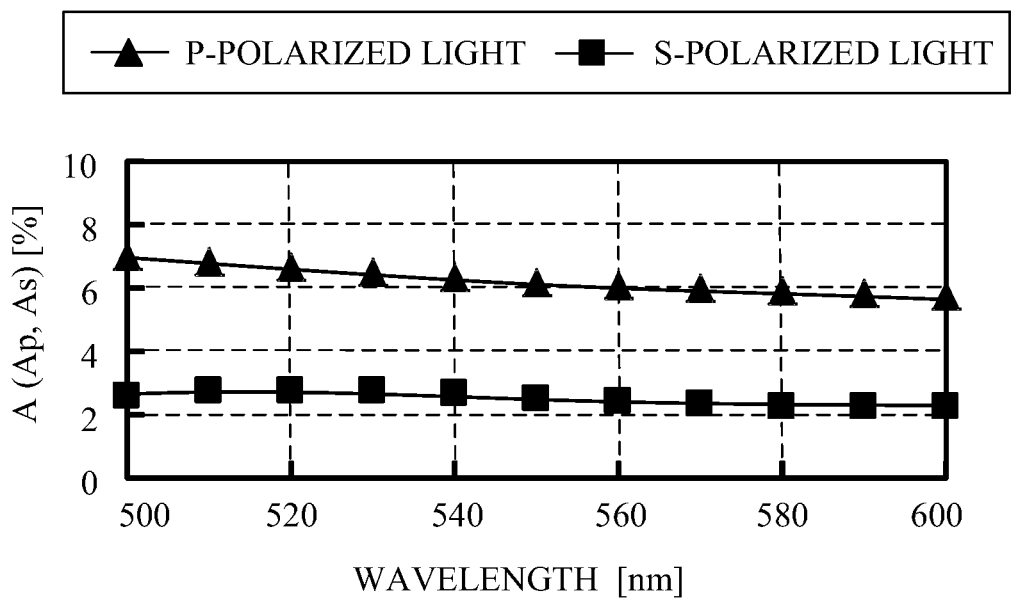

FIG. 15A shows reflectances of the polarization beam splitting part 3 for the s-polarized light and the p-polarized light at various wavelengths when an entering beam enters an entrance surface of the prism (2) perpendicularly thereto, that is, when the entering beam enters the polarization beam splitting part 3 from a direction forming an angle of 45 degrees with respect to a direction perpendicular to a surface of the polarization beam splitting part 3. FIG. 15B shows absorption losses for the s-polarized light and the p-polarized light at the various wavelengths.

As shown in FIGS. 15A and 15B, the polarization beam splitting part 3 in Embodiment 6 has, in a wavelength range from 500 nm to 600 nm, a higher reflectance Rs for the s-polarized light than 95% (Rs>95%), a lower absorption loss As for the s-polarized light than 3% (As<3%) and a lower absorption loss Ap for the p-polarized light than 7% (Ap<7%)

Table 8 collectively shows values for the conditions (1)-(4) in Embodiments 1-6.

Embodiment 7

Figure 16:
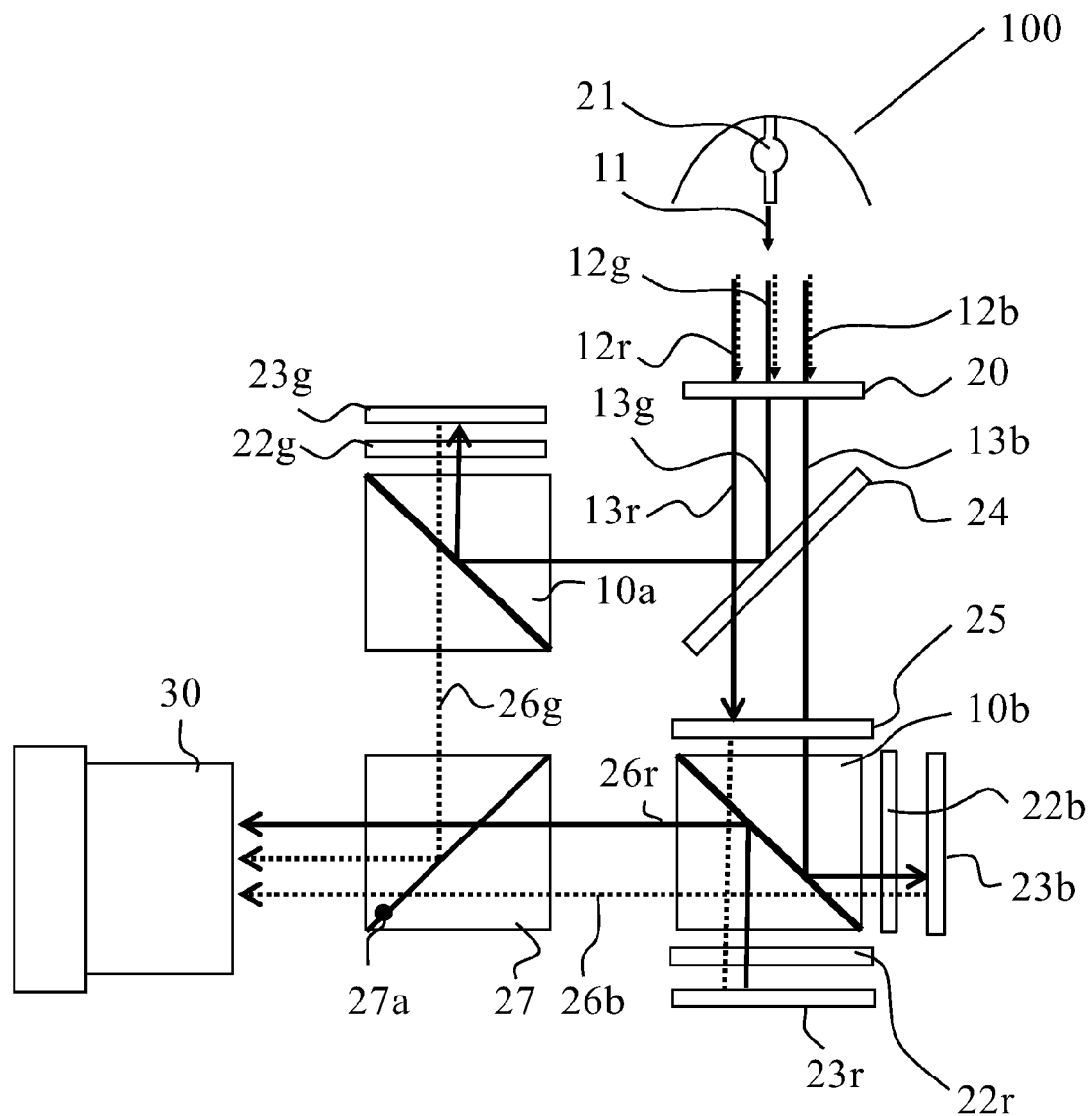
FIG. 16 shows a configuration of a liquid crystal projector that is Embodiment 7 of the present invention.

FIG. 16 shows a configuration of a liquid crystal projector (image projection apparatus) that is a seventh embodiment of the present invention, the projector using any one of the polarization beam splitting elements of Embodiments 1-6. The projector 100 includes a light source lamp 21, a polarization conversion element 20, a dichroic mirror 24, a wavelength selective phase difference plate 25 and polarization beam splitters 10a and 10b. At least one of the polarization beam splitters 10a and 10b corresponds to the polarization beam splitting element described in any one of Embodiments 1-6.

Moreover, the projector 100 includes reflective liquid crystal panels 23g, 23b and 23r that are light modulation elements, phase difference plates 22g, 22b and 22r, a color combining prism 27 and a projection lens (projection optical system) 30.

White light (including green light 12g, blue light 12b and red light 12r) emitted from the light source lamp 21 enters an illumination optical system to be converted into a collimated light flux 11, and enters the polarization conversion element 20 included in the illumination optical system.

The polarization conversion element 20 converts non-polarized light (light flux 11) entering from the light source lamp 21 into s-polarized light (green polarized light 13g, blue polarized light 13b and red polarized light 13r).

Next, among the green polarized light 13g, the blue polarized light 13b and the red polarized light 13r exiting from the polarization conversion element 20 and entering the dichroic mirror 24, the green polarized light 13g is reflected thereby, and the blue polarized light 13b and the red polarized light 13r are transmitted therethrough. The green polarized light 13g reflected by the dichroic mirror 24 enters the polarization beam splitter 10a to be reflected thereby, passes through the phase difference plate 22g, and then enters the reflective liquid crystal panel 23g for green. On the other hand, the blue polarized light 13b and the red polarized light 13r transmitted through the dichroic mirror 24 enter the wavelength selective phase difference plate 25 where only the polarization direction of the red polarized light 13r is rotated by 90 degrees. Thus, the blue polarized light 13b as the s-polarized light without change and the red polarized light 13r that is p-polarized light enter the polarization beam splitter 10b.

Then, the blue polarized light 13b is reflected by the polarization beam splitter 10b, passes through the phase difference plate 22b, and then enters the reflective liquid crystal panel 23b for blue. The red polarized light 13r is transmitted through the polarization beam splitter 10b, passes through the phase difference plate 22r, and then enters the reflective liquid crystal panel 23r for red. An optical system from the dichroic mirror 24 to the polarization beam splitters 10a and 10b corresponds to a color separation optical system that separates the white light from the light source lamp 21 into plural color lights.

Each reflective liquid crystal panel reflects and modulates the entering light according to an image signal to produce image light (green image light 26g, blue image light 26b and red image light 26r). The green image light 26g modulated by the reflective liquid crystal panel 23g for green passes through the phase difference plate 22g again, and then is transmitted through the polarization beam splitter 10a to enter the color combining prism 27. Moreover, the blue image light 26b modulated by the reflective liquid crystal panel 23b for blue passes through the phase difference plate 22b again, and then is transmitted through the polarization beam splitter 10b to enter the color combining prism 27. The red image light 26r modulated by the reflective liquid crystal panel 23r for red passes through the phase difference plate 22r again, and then is reflected by the polarization beam splitter 10b to enter the color combining prism 27.

The green image light 26g is reflected by a dichroic film 27a in the color combining prism 27, and the blue image light 26b and the red image light 26r are transmitted through the dichroic film 27a. Thus, the green image light 26g, the blue image light 26b and the red image light 26r are combined, and then enter the projection lens 30 to be projected thereby onto a projection surface such as a screen (not shown). The polarization beam splitter 10b and the color combining prism 27 constitute a color combination optical system.

Although this embodiment includes a color separation/combination optical system integrally constituted by the color separation optical system and the color combination optical system, a color separation optical system and a color combination optical system may be configured separately from each other, such as a case where transmissive liquid crystal panels are used as light modulation elements. Moreover, other light modulation elements than the liquid crystal panel may be used such as a digital micro-mirror device (DMD).

The liquid crystal projector of this embodiment using any one of the polarization beam splitting elements of Embodiment 1-6 as the at least one of the polarization beam splitters 10a and 10b enables display of bright projected images with high contrast.

Although this embodiment has described the case where the non-polarized light from the light source lamp 21 is converted into the s-polarized light by the polarization conversion element 20, the non-polarized light may be converted into p-polarize light. Furthermore, although this embodiment has described the case where the green light is separated from the white light by the dichroic mirror 24, another color light (blue light or red light) may be separated.

TABLE 1

|  | n | d [nm] |
|---|---|---|
| PRISM | 1.75 | — |
| H | 2.34 | 137 |
| L | 1.46 | 103 |
| H | 2.34 | 38 |
| L | 1.46 | 118 |
| H | 2.34 | 75 |
| L | 1.46 | 139 |
| WG | (Al-air) | 25 |
| L | 1.46 | 121 |
| H | 2.34 | 76 |
| L | 1.46 | 46 |
| H | 2.34 | 134 |
| PRISM | 1.75 | — |

TABLE 2

|       | n         | d [nm] |
|-------|-----------|--------|
| PRISM | 1.75      | —      |
| H     | 2.34      | 128    |
| L     | 1.46      | 119    |
| H     | 2.34      | 39     |
| L     | 1.46      | 153    |
| WG    | (Al-air)  | 18     |
| L     | 1.46      | 153    |
| H     | 2.34      | 39     |
| L     | 1.46      | 119    |
| H     | 2.34      | 128    |
| PRISM | 1.75      | —      |

TABLE 3

|       | n         | d [nm] |
|-------|-----------|--------|
| PRISM | 1.75      | —      |
| H     | 2.34      | 149    |
| L     | 1.46      | 102    |
| H     | 2.34      | 55     |
| L     | 1.46      | 113    |
| H     | 2.34      | 69     |
| L     | 1.46      | 135    |
| WG    | (Al-n1.46)| 32     |
| L     | 1.46      | 79     |
| H     | 2.34      | 79     |
| L     | 1.46      | 91     |
| H     | 2.34      | 153    |
| PRISM | 1.75      | —      |

TABLE 4

|       | n         | d [nm] |
|-------|-----------|--------|
| PRISM | 1.8       | —      |
| H     | 2.34      | 177    |
| L     | 1.52      | 39     |
| H     | 2.34      | 59     |
| L     | 1.52      | 127    |
| H     | 2.34      | 75     |
| L     | 1.52      | 99     |
| WG    | (Al-n1.52)| 30     |
| L     | 1.52      | 99     |
| H     | 2.34      | 75     |
| L     | 1.52      | 127    |
| H     | 2.34      | 59     |
| L     | 1.52      | 39     |
| H     | 2.34      | 177    |
| PRISM | 1.8       | —      |

TABLE 5

|       | n         | d [nm] |
|-------|-----------|--------|
| PRISM | 1.6       | —      |
| H     | 1.98      | 161    |
| L     | 1.38      | 44     |
| H     | 1.98      | 77.5   |
| L     | 1.38      | 120    |
| H     | 1.98      | 74     |
| L     | 1.38      | 83     |
| WG    | (Al-n1.38)| 34     |
| L     | 1.38      | 83     |
| H     | 1.98      | 74     |
| L     | 1.38      | 120    |
| H     | 1.98      | 77.5   |
| L     | 1.38      | 44     |
| H     | 1.98      | 161    |
| PRISM | 1.6       | —      |

TABLE 6

|       | n         | d [nm]  |
|-------|-----------|---------|
| PRISM | 1.6       | —       |
| H     | 1.98      | 108.94  |
| L     | 1.38      | 225.57  |
| H     | 1.98      | 29.15   |
| L     | 1.38      | 95.7    |
| WG    | (Al-n1.38)| 45      |
| PRISM | 1.6       | —       |

TABLE 7

|       | n         | d [nm] |
|-------|-----------|--------|
| PRISM | 1.75      | —      |
| L     | 1.46      | 118    |
| H     | 2.34      | 49     |
| L     | 1.48      | 159    |
| H     | 1.46      | 132    |
| WG    | (Al-n1.46)| 25     |
| L     | 1.46      | 101    |
| H     | 2.34      | 198    |
| L     | 1.46      | 106    |
| PRISM | 1.75      | —      |

TABLE 8

| | EMBODIMENT | | | | | |
|---|---|---|---|---|---|---|
| | 1 | 2 | 3 | 4 | 5 | 6 |
| GRATING PERIOD Λ | 100 | 100 | 100 | 100 | 100 | 100 |
| GRATING THICKNESS d | 25 | 18 | 32 | 30 | 34 | 45 |
| METAL GRATING WIDTH w | 45 | 40 | 37 | 35 | 35 | 42 |
| $n_L$ | 1.46 | 1.46 | 1.46 | 1.52 | 1.38 | 1.38 |
| $n_H$ | 2.34 | 2.34 | 2.34 | 2.34 | 1.98 | 1.98 |
| $n_P$ | 1.75 | 1.75 | 1.75 | 1.8 | 1.6 | 1.6 |
| CONDITION (1) w/Λ | 0.45 | 0.4 | 0.37 | 0.35 | 0.35 | 0.42 |
| CONDITION (2) d/w | 0.56 | 0.45 | 0.86 | 0.86 | 0.97 | 1.07 |
| CONDITION (3) $n_H/n_L$ | 1.60 | 1.60 | 1.60 | 1.54 | 1.43 | 1.43 |
| CONDITION (4) $(n_L/n_H) \times \tan\theta_L$ | 0.996 | 0.996 | 0.996 | 0.995 | 0.998 | 0.998 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-070176, filed on Mar. 28, 2011, which is hereby incorporated by reference herein in its entirety.

What is claimed is:

1. A polarization beam splitting element configured to split an entering beam according to polarization directions, the element comprising in order from a beam entrance side:
   an entrance side multi-layered film layer constituted by laminated multiple dielectric films; and
   a one-dimensional grating structure having a grating period smaller than a wavelength of the entering beam and formed of a metal,
   wherein, when a medium existing on the beam entrance side further than the entrance side multi-layered film layer is referred to as an entrance medium, the multiple dielectric films constituting the entrance side multi-layered film layer include at least one dielectric film having a higher refractive index than that of the entrance medium and at least one dielectric film having a lower refractive index than that of the entrance medium.

2. A polarization beam splitting element according to claim 1, wherein the one-dimensional grating structure has a grating period of 120 nm or less, and has a grating period λ and a grating width w that satisfy the following condition:

$0.25 \leq w/\lambda \leq 0.60$.

3. A polarization beam splitting element according to claim 1, wherein, among refractive indices of the multiple dielectric films constituting the entrance side multi-layered film layer, a highest refractive index $n_H$ and a lowest refractive index $n_L$ satisfy the following condition:

$n_H/n_L > 1.4$, wherein an entrance direction of the entering beam into the element is oblique to a perpendicular direction to the entrance side multi-layered film layer, and wherein the highest refractive index $n_H$, the lowest refractive index $n_L$ and a refraction angle $\theta_L$ satisfy the following condition, the refraction angle $\theta_L$ being formed between the entering beam propagating in the dielectric film having the lowest refractive index $n_L$ and a normal to that lowest refractive index dielectric film:

$0.9 < (n_L/n_H) \times \tan \theta_L < 1.1$.

4. A polarization beam splitting element according to claim 1, wherein, when an entrance direction of the entering beam into the element is oblique to a perpendicular direction to the entrance side multi-layered film layer, a reflectance of the element for s-polarized light component of the entering beam is 90% or more, and wherein a thickness of the one-dimensional grating structure is 50 nm or less.

5. A polarization beam splitting element according to claim 1, wherein air or a dielectric material is disposed between gratings in the one-dimensional grating structure.

6. A polarization beam splitting element according to claim 1, wherein a dielectric material is disposed between gratings in the one-dimensional grating structure, and wherein the dielectric material disposed between gratings is a same dielectric material as that forming one dielectric film that is included in the multiple dielectric films constituting the entrance side multi-layered film layer and that is adjacent to the one-dimensional grating structure.

7. A polarization beam splitting element according to claim 1, wherein one dielectric film that is included in the multiple dielectric films constituting the entrance side multi-layered film layer and that is adjacent to the one-dimensional grating structure has a lowest refractive index among the multiple dielectric films.

8. A polarization beam splitting element according to claim 1, wherein an exit side multi-layered film layer is disposed on a beam exit side further than the one-dimensional grating structure, and wherein the exit side multi-layered film layer is constituted by laminated multiple dielectric films that include at least one dielectric film having a higher refractive index than that of the entrance medium and at least one dielectric film having a lower refractive index than that of the entrance medium.

9. An image projection apparatus comprising:

a color separation optical system configured to separate light from a light source into plural color lights;

light modulation elements configured to respectively modulate the color lights; and a projection optical system configured to project the color lights from the light modulation elements to a projection surface, wherein the color separation optical system includes a polarization beam splitting element configured to split an entering beam as the light from the light source according to polarization directions, the polarization beam splitting element comprising in order from a beam entrance side:

an entrance side multi-layered film layer constituted by laminated multiple dielectric films; and a one-dimensional grating structure having a grating period smaller than a wavelength of the entering beam and formed of a metal, wherein, when a medium existing on the beam entrance side further than the entrance side multi-layered film layer is referred to as an entrance medium, the multiple dielectric films constituting the entrance side multi-layered film layer include at least one dielectric film having a higher refractive index than that of the entrance medium and at least one dielectric film having a lower refractive index than that of the entrance medium.

* * * * *